United States Patent
Cheng et al.

(10) Patent No.: US 10,869,315 B2
(45) Date of Patent: Dec. 15, 2020

(54) RANGING BASED LOCATION SERVICES IN WIRELESS COMMUNICATION

(71) Applicant: QUALCOMM Incorporated, San Diego, CA (US)

(72) Inventors: Hong Cheng, Bridgewater, NJ (US); Sudhir Kumar Baghel, Hillsborough, NJ (US); Michaela Vanderveen, Tracy, CA (US); Zhibin Wu, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 30 days.

(21) Appl. No.: 16/286,326

(22) Filed: Feb. 26, 2019

(65) Prior Publication Data

US 2019/0274130 A1 Sep. 5, 2019

Related U.S. Application Data

(60) Provisional application No. 62/637,937, filed on Mar. 2, 2018.

(51) Int. Cl.
*H04W 72/04* (2009.01)
*H04W 64/00* (2009.01)
(Continued)

(52) U.S. Cl.
CPC ........... *H04W 72/048* (2013.01); *H04W 4/40* (2018.02); *H04W 64/00* (2013.01);
(Continued)

(58) Field of Classification Search
CPC ................................................ H04W 72/048
(Continued)

(56) References Cited

U.S. PATENT DOCUMENTS 9,179,433 B1 * 11/2015 Malhotra ............... H04W 36/34
10,103,762 B1 * 10/2018 Bullington ............. G16H 40/20
(Continued)

FOREIGN PATENT DOCUMENTS

EP       3422793 A1   1/2019
WO    2017027450 A1   2/2017
WO    2017161570 A1   9/2017

OTHER PUBLICATIONS

3rd Generation Partnership Project; Technical Specification Group Services and System Aspects; Procedures for the 5G System; Stage 2 (Release 15), 3GPP Draft, 23502-F00, 3rd Generation Partnership Project (3GPP), Mobile Competence Centre, 650, Route Des Lucioles , F-06921 Sophia-Antipolis Cedex, France, Jan. 29, 2018 (Jan. 29, 2018), XP051384054, 258 Pages, Retrieved from the Internet: URL:http://www.3gpp.org/ftp/tsg%5Fct/WG4%5Fprotocollars%5Fex%2DCN4!TSGCT4%5F82%5FGothenburg/Docs/ [retrieved on Jan. 29, 2018], Chapter 4.13.5.

(Continued)

*Primary Examiner* — Peter G Solinsky
(74) *Attorney, Agent, or Firm* — Loza & Loza LLP

(57) ABSTRACT

A network architecture is disclosed with support for location services (LCS). A radio access network (RAN) node receives a registration request from a user equipment (UE), indicating that the UE supports a ranging based location service session. The RAN node further receives an internal identifier (ID) for identifying information associated with the UE in communication between the RAN node and a core network during the ranging based location service session. The RAN node allocates radio resources to the UE for performing a ranging operation involving a plurality of devices including the UE, and associates the radio resources with the internal ID of the UE for identifying location (Continued)

results. Then the RAN node informs the UE of the radio resources allocated for the ranging operation.

38 Claims, 13 Drawing Sheets

(51) Int. Cl.
| | | |
|---|---|---|
| H04W 4/40 | (2018.01) | |
| H04W 72/12 | (2009.01) | |
| H04W 76/27 | (2018.01) | |
| H04W 4/02 | (2018.01) | |
| H04W 4/70 | (2018.01) | |
| H04W 4/06 | (2009.01) | |

(52) U.S. Cl.
CPC ....... *H04W 72/0406* (2013.01); *H04W 72/12* (2013.01); *H04W 76/27* (2018.02); *H04W 4/02* (2013.01); *H04W 4/06* (2013.01); *H04W 4/70* (2018.02)

(58) Field of Classification Search
USPC .......................................................... 370/329
See application file for complete search history.

(56) References Cited

U.S. PATENT DOCUMENTS

| | | | |
|---|---|---|---|
| 10,219,186 B1* | 2/2019 | Tailor .................... | H04W 36/14 |
| 2004/0019672 A1 | 1/2004 | Das et al. | |
| 2007/0259677 A1* | 11/2007 | Waxman ................. | H04W 4/14 |
| | | | 455/466 |
| 2011/0070863 A1* | 3/2011 | Ma ........................ | H04W 4/021 |
| | | | 455/410 |
| 2014/0094188 A1* | 4/2014 | Kazmi .................. | H04W 4/023 |
| | | | 455/456.1 |
| 2014/0211973 A1* | 7/2014 | Wang .................... | H04W 8/005 |
| | | | 381/315 |
| 2015/0052195 A1* | 2/2015 | Li ........................... | H04L 67/18 |
| | | | 709/203 |
| 2015/0106183 A1* | 4/2015 | McEvilly .............. | H04W 4/025 |
| | | | 705/14.25 |
| 2016/0156638 A1* | 6/2016 | Somani ................. | H04W 12/12 |
| | | | 726/7 |
| 2016/0295398 A1* | 10/2016 | Ketheesan ............. | H04W 8/02 |
| 2018/0131540 A1 | 5/2018 | Malik et al. | |
| 2019/0098569 A1* | 3/2019 | Hou ....................... | H04W 48/18 |
| 2019/0182876 A1* | 6/2019 | Ying ....................... | H04W 8/06 |
| 2020/0100128 A1* | 3/2020 | Fan ........................ | H04W 24/10 |
| 2020/0107153 A1* | 4/2020 | Li ........................... | H04L 67/18 |
| 2020/0120518 A1* | 4/2020 | Geng ..................... | H04W 52/24 |

OTHER PUBLICATIONS

3rd Generation Partnership Project; Technical Specification Group Services and System Aspects; Study on Security Aspects for LTE Support of V2X Services (Release 14), 3GPP Standard, 3GPP TR 33.885, 3rd Generation Partnership Project (3GPP), Mobile Competence Centre, 650, Route Des Lucjoles , F-06921 Sophia-Antipolis Cedex, France, vol. SA WG3, No. V1.1.0, Feb. 27, 2017 (Feb. 27, 2017), pp. 1-86, XP051230808, [retrieved on Feb. 27, 2017], Chapter 6.15.
International Search Report and Written Opinion—PCT/US2019/019739—ISA/EPO—dated May 7, 2019.
Qualcomm Incorporated: "Addition of an LMF Based Location Solution", 3GPP Draft, S2-182300 (P-CR For TR 23.731 For LMF Based Location Solution)-R3, 3rd Generation Partnership Project (3GPP), Mobile Competence Centre , 650, Route Des Lucioles , F-06921 Sophia-Antipolis, vol. SA WG2, No. Montreal, Canada, Feb. 26, 2018-Mar. 2, 2018, Mar. 1, 2018 (Mar 1, 2018), XP051394008, 20 Pages, Retrieved from the Internet: URL:http://www.3gpp.org/ftp/Meetings%5F3GPP%5FSYNC/SA2/%5FUpdate02/ [retrieved on Mar. 1, 2018], Chapters 6.X.2.1, 6.X.3.

* cited by examiner

RANGING BASED LOCATION SERVICES IN WIRELESS COMMUNICATION

PRIORITY CLAIM

This application claims priority to and the benefit of provisional patent application No. 62/637,937, filed in the United States Patent and Trademark Office on Mar. 2, 2018, the entire content of which is incorporated herein by reference as if fully set forth below in its entirety and for all applicable purposes.

TECHNICAL FIELD

The technology discussed below relates generally to wireless communication systems, and more particularly, to location services with support for ranging in a wireless communication system and related communication devices.

INTRODUCTION

A wireless network can provide various services in addition to voice and data communication. One such service is location service (LCS) that can be used by a user to determine a position or location. LCS may utilize one or more positioning methods to determine the location of the user, for example, a user equipment (UE) or vehicle. For example, LCS may use an observed time difference of arrival (OTDOA) method, Assisted Global Navigation Satellite System (A-GNSS) method, and/or uplink-time difference of arrival (UTDOA) method. In this disclosure, positioning generally refers to a process of determining the position, location, and/or velocity of a device using radio signals.

In a wireless network, LCS may be implemented with support of ranging based positioning. When one wireless device communicates directly with another wireless device, the communication may be referred to as device-to-device (D2D) communication. In particular use cases, a wireless communication device may be a UE such as a portable cellular device, or may be a vehicle, such as an automobile, a drone, or may be any other connected device. When the devices are vehicles, such as automobiles, the D2D communication may be referred to as vehicle-to-vehicle (V2V) communication. Other vehicle-based communications may include vehicle-to-everything (V2X), which may include V2V, vehicle-to-infrastructure (V2I), vehicle-to-network (V2N), and vehicle-to-pedestrian (V2P). V2X communications and particularly V2V communications will become more and more important in the future for collision avoidance and autonomous driving applications. For example, a vehicle that uses V2X communications in ranging operations can assist a network in determining the location of the vehicle.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure relate to a network architecture with support for ranging based location services (LCS) in wireless communication.

One aspect of the present disclosure provides a method of providing a location service at a radio access network (RAN) including a first RAN node. The first RAN node may include a communication interface configured for wireless communication, a memory, and a processor operatively coupled to the communication interface and the memory. The processor and the memory may be configured to perform ranging based positioning and related location services. The first RAN node receives a registration request from a user equipment (UE), and the connection request indicates that the UE supports a ranging based location service session. The first RAN node receives an Internal identifier (ID) for identifying information, associated with the UE, between the first RAN node and a core network during the ranging based location service session. The first RAN node allocates radio resources, associated with the Internal ID, to the UE for performing a ranging operation in the ranging based location service session involving a plurality of devices including the UE. The first RAN node transmits a registration response to the UE, indicating the allocated radio resources for performing the ranging operation.

Another aspect of the present disclosure provides a method of operating a user equipment (UE) in a communication network. The UE may include a communication interface configured for wireless communication, a memory, and a processor operatively coupled to the communication interface and the memory. The processor and the memory may be configured to perform ranging based positioning and related location services. The UE transmits a registration request to a radio access network (RAN), and the registration request indicates that the UE supports a ranging based location service session. The UE, from the RAN, receives an allocation of radio resources for performing a ranging operation and an External identifier (ID) allocated by a core network for identifying a location result of the UE based on the ranging operation. The UE receives the location result generated by the core network in the ranging based location service session, and the location result is identified by the External ID associated with the UE.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
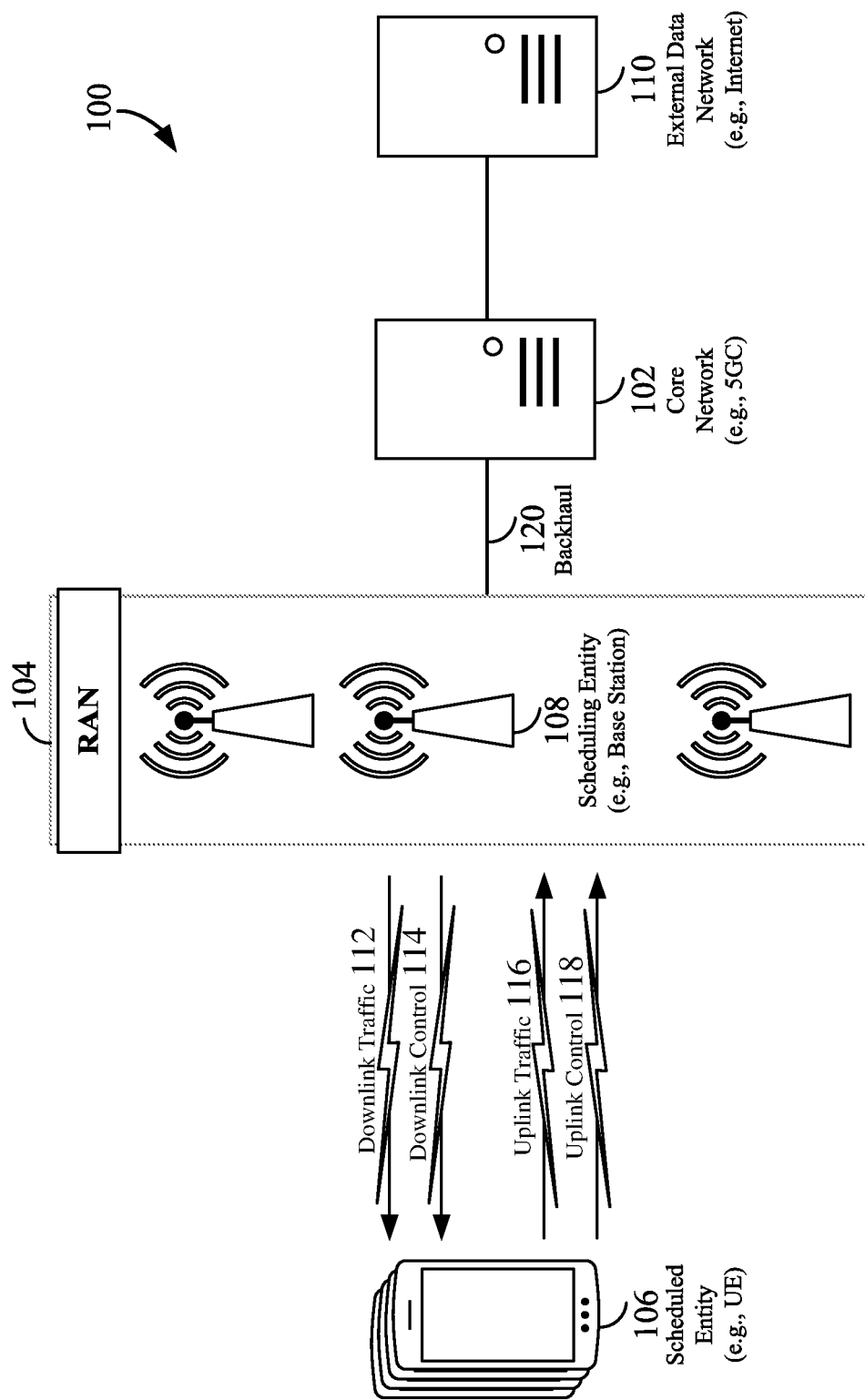
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

This disclosure describes a network architecture with support for ranging based location services (LCS). When a user equipment (UE) registers with a network, the UE can indicate support of ranging based LCS. A radio access network (RAN) node receives the registration request and indicates to the core network that the UE supports a ranging based location service session. The network uses an internal identifier (ID) for identifying information associated with the UE in communication between the RAN node and the core network during the ranging based location service session, and an external ID associated with the UE for transmitting the location results back to the UE.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN (NG-RAN). Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus, a vehicle, or a component of a vehicle that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global navigation satellite system (GNSS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
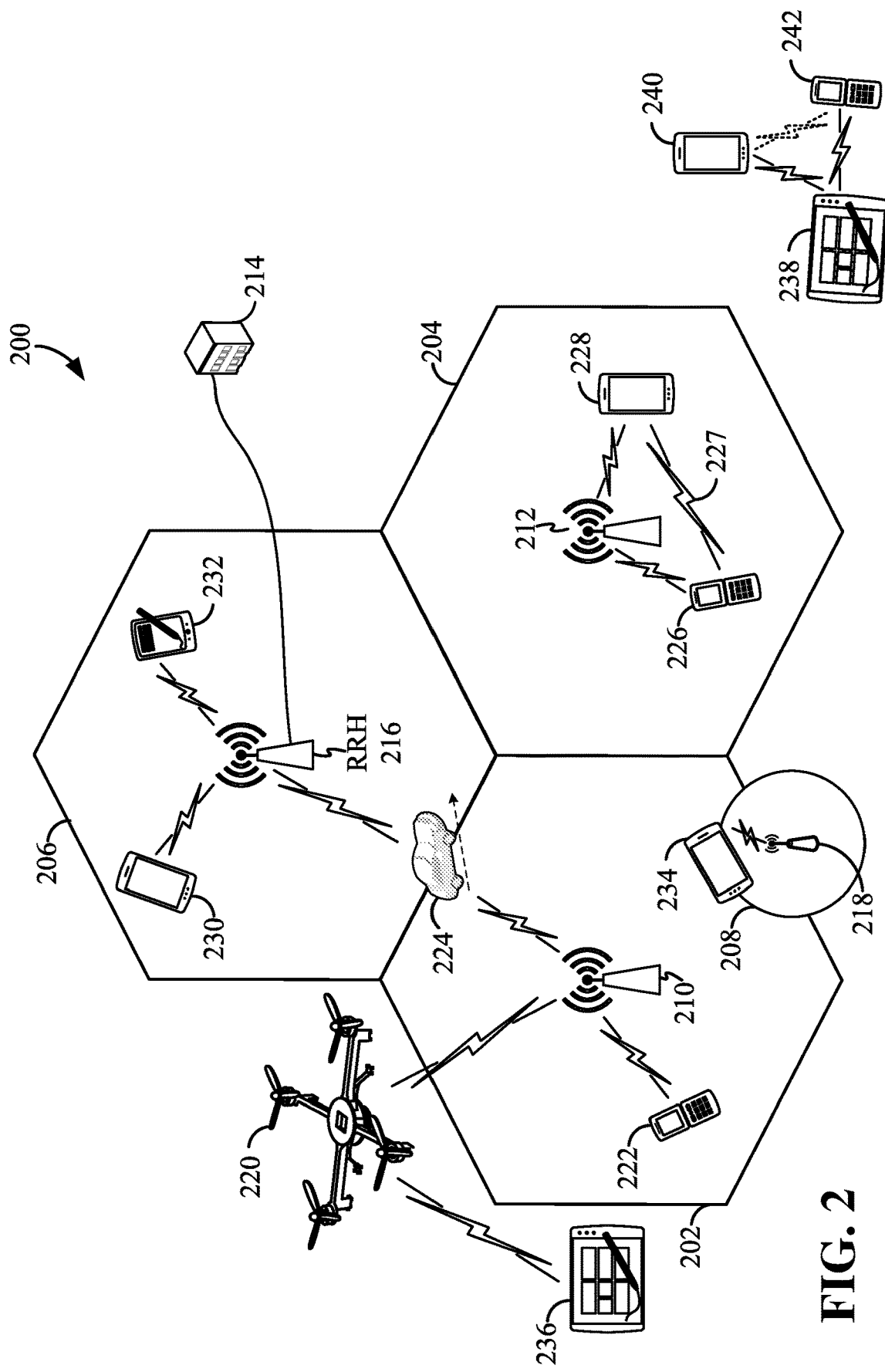
FIG. 2 is a conceptual illustration of an example of a radio access network.

FIG. 2 is a conceptual illustration of an example of a radio access network 200 (RAN). In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown) or zones. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer-to-peer (P2P), device-to-device (D2D), vehicle-to-vehicle (V2V), vehicle-to-everything (V2X), or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a D2D, P2P, V2X, or V2V network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P/D2D/V2X/V2V configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated in FIG. 2, part of the core network 102 in FIG. 1), which may include a security context management function (SCMF) that manages the security context for both the control plane and the user plane functionality, and a security anchor function (SEAF) that performs authentication. The AMF is an example of a core network entity.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at sometimes the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used.

That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In 5G NR specifications, user data may be coded using quasi-cyclic low-density parity check (LDPC) with two different base graphs: one base graph is used for large code blocks and/or high code rates, while the other base graph is used otherwise. Control information and the physical broadcast channel (PBCH) may be coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In a downlink (DL) transmission, the transmitting device (e.g., the scheduling entity 108) may allocate time-frequency resources (e.g., one or more resource elements (REs)) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS), a secondary synchronization signal (SSS), demodulation reference signals (DM-RS), phase-tracking reference signals (PT-RS), channel-state information reference signals (CSI-RS), etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an uplink (UL) transmission, a transmitting device (e.g., a scheduled entity 106) may utilize time-frequency resources (e.g., one or more REs) to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, time-frequency resources may be allocated for UL and/or DL user data or traffic data. Such traffic may be carried on one or more traffic channels, such as, for a DL transmission, a physical downlink shared channel (PDSCH); or for an UL transmission, a physical uplink shared channel (PUSCH). In some examples, certain time-frequency resources may be configured to carry system information blocks (SIBs), carrying information that may enable access to a given cell. In some examples, certain time-frequency resources may be allocated for P2P, D2D, V2V, and/or V2X traffic.

The channels or carriers described above are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Location Services Architecture

Figure 3:
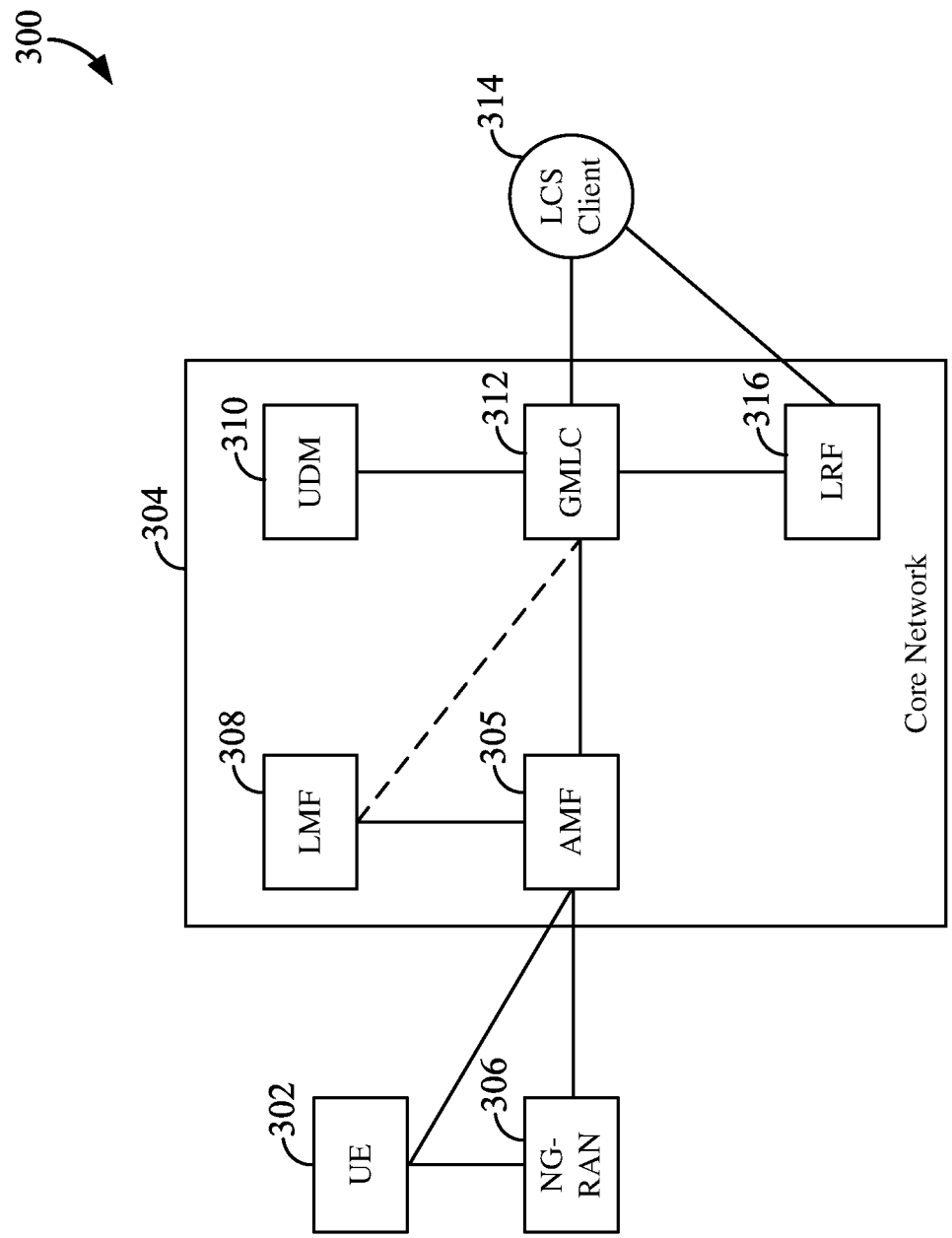
FIG. 3 is a block diagram illustrating a network architecture with support for location services according to some aspects of the disclosure.
Figure 4:
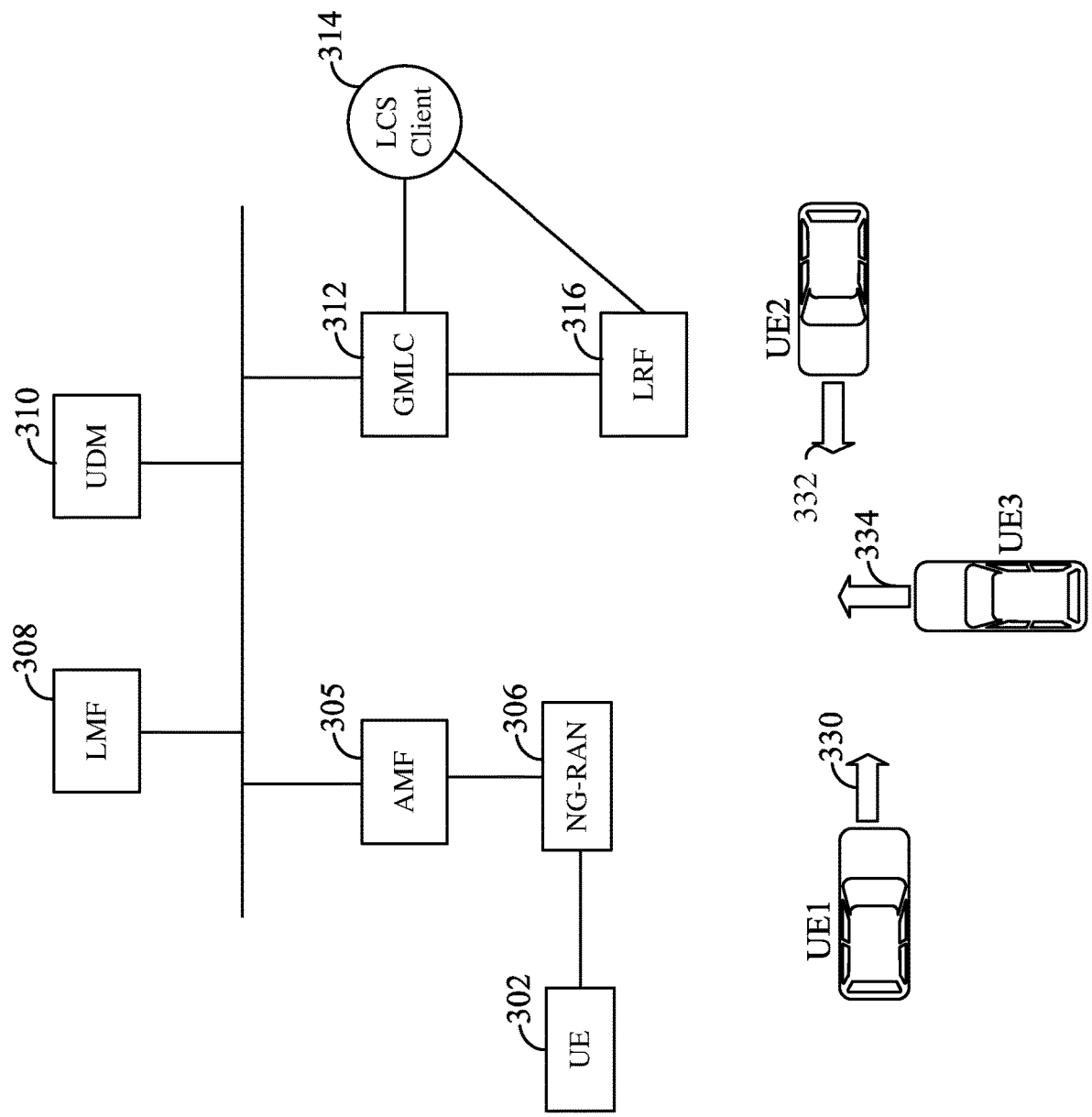
FIG. 4 is a diagram illustrating architectural support for location services using service-based interface representation according to some aspects of the disclosure.

FIG. 3 is a diagram illustrating a network architecture 300 with support for location services (LCS) according to some aspects of the disclosure. FIG. 4 is a diagram illustrating architectural support for location services using a service-based interface representation of the network 300 according to some aspects of the disclosure. This network architecture 300 may be implemented using the wireless network illustrated and described in relation to FIGS. 1 and 2. In this example, a UE 302 can access a core network (CN) 304 via a next generation (NG)-RAN 306. The core network 304 may be the core network 102, and the NG-RAN 306 may be the RAN 104. The NG-RAN 306 consists of gNBs and/or eNBs that communicate with the core network 304. The core network 304 includes various network functions and entities, for example, a location management function (LMF) 308, an access and mobility management function (AMF) 305, a unified data management (UDM) 310, a gateway mobile location center (GMLC) 312, and a location retrieval function (LRF) 316. In an alternative architecture, the GMLC may have a direct interface with the LMF and can communicate directly with it. In this alternative configuration, the AMF may perform a simple forwarding function between the LMF and NG-RAN or UE.

The core network 304 may support LCS using various positioning mechanism, for example, uplink and downlink cell coverage based positioning methods, an observed time difference of arrival (OTDOA) positioning method, an Assisted Global Navigation Satellite System (A-GNSS) based positioning method, an uplink-time difference of arrival (UTDOA) positioning method, etc. In some aspects of the disclosure, the core network 304 may support a ranging based positioning method, for example, in vehicle-to-vehicle (V2V) or vehicle-to-everything (V2X) applications. The term "ranging" refers to measuring and/or determining the distances between pairs of devices, vehicles, UEs, or pairs of antennas on respective UEs. The measured distances can be combined with other positioning methods, e.g., satellite-based positions, to refine or improve UE position estimation. Ranging based V2X positioning can improve the accuracy of vehicle location determination to the order of centimeters or better. In some examples, ranging signals transmitted by UEs can be concentrated in a short period of time to achieve highly accurate ranging measurements.

The AMF 305 can provide various functions, for example, registration management, connection management, mobility management, access authentication/authorization, location services management, transport for location services messages between UE and LMF as well as between NG-RAN and LMF. The AMF is an example of a core network node.

The LMF 308 can provide various functions, for example, receiving ranging information from the UEs, determining UEs' locations, obtaining downlink location measurements or a location estimate from the UE, obtaining uplink location measurements from the NG-RAN 306, and/or obtaining non-UE associated assistance data from the NG-RAN 306, etc.

The UDM 310 provides various functions, for example, user identification handling (e.g., storage and management of SUPI (Subscriber Permanent Identifier) for each subscriber), access authorization based on subscription data, UE's serving network function registration management, and subscription management.

The GMLC 312 provides a service interface to a location service (LCS) client 314. The LRF 316 retrieves location information for users that have initiated an emergency session.

In one example, a group of UEs (e.g., UE1, UE2, UE3 in FIG. 4) can participate in a ranging operation with respective allocated radio resources. UE1 may transmit a ranging signal 330 using first radio resources (Rsrc1) and a first Zadoff-Chu (ZC) sequence (ZC-seq1). UE2 may transmit a ranging signal 332 using second radio resources (Rsrc2) and a second ZC sequence (ZC-seq2). UE3 may transmit a ranging signal 334 using third radio resources (Rsrc3) and a third ZC sequence (ZC-seq3). In the ranging operation, each UE measures the ranging signal received from other UEs. The radio resources may be time-frequency resources scheduled by a scheduling entity.

Therefore, if UE1 receives the ranging signal 332 from UE2 sent using Rsrc2 and ZC-seq2, UE1 can determine the time of arrival (TOA) for this measurement (denoted as TOA12). This result may be stored in a result vector (TOA12, Rsrc2, ZC-seq2) Similarly, if UE1 receives the ranging signal 334 from UE3 sent using Rsrc3 and ZC-seq3, UE1 can determine the corresponding TOA for this measurement (denoted as TOA13). This result may be stored as a result vector (TOA13, Rsrc3, ZC-seq3). Similarly, UE2 can measure the ranging signal 330 of UE1 and ranging signal 334 of UE3, and store the measurements in result vectors (TOA21, Rsc1, ZC-seq1) and (TOA23, Rsrc3, ZC-seq3). UE3 can perform similar measurements and obtain the result vectors (TOA31, Rsc1, ZC-seq1); (TOA32, Rsrc2, ZC-seq2).

Each UE reports its result vectors in a certain radio resource based ranging report to a RAN node (e.g., gNB). The RAN node may convert the radio resource based ranging report to an Internal ID based ranging report that is described in more detail below in relation to FIGS. 7-10. In the radio resource based ranging report, ranging results are indexed or identified by the radio resources used to perform the corresponding ranging operations. In an Internal ID based ranging report, ranging results are indexed or identified by the Internal IDs of the UEs. For example, in UE1's radio resource based ranging report, the RAN node can find: [Rsrc1, ZC-seq1] (ToA12, Rsrc2, ZC-seq2); (ToA13, Rsrc3, ZC-seq3). The RAN node knows that [Rsrc1, ZC-seq1] corresponds to Internal ID1 that is assigned to UE1, (Rsrc2, ZC-seq2) corresponds to Internal ID2 that is assigned to UE2, and (Rsrc3, ZC-seq3) corresponds to Internal ID3 that is assigned to UE3. The RAN node can make these associations based on previous or predetermined radio resource allocation and an Internal ID allocation procedure.

Therefore, the RAN node can convert UE1's report to an Internal ID based ranging report that includes: [Internal ID1], (TOA12, Internal ID2), (TOA13, Internal ID3) Similarly, the RAN node can convert reports from UE2 and UE3. As a result, UE2's Internal ID based ranging report includes: [Internal ID2], (TOA21, Internal ID1), (TOA23, Internal ID3) Similarly, UE3's Internal ID based ranging report includes: [Internal ID3], (TOA31, Internal ID1), (TOA32, Internal ID2). After the conversion, the RAN node can report these Internal ID based ranging reports to the LMF, either individually or aggregated. The LMF can perform location calculation based on the ranging reports from all the UE1, UE2, and UE3. An exemplary location calculation includes taking all the reported TOA values and calculating the relevant round-trip time (RTT) value to determine the range between UEs.

For example, a TOA indicates the distance d between two UEs, where the TOA=d/c+/−$T_{off}$, with the speed of light being designated by c and the offset of the clock designated by $T_{off}$. The clock offset $T_{off}$ may be a few microseconds (μs) and can be accommodated by the TOA range, for example, between −4000 nanoseconds (ns) and 4000 ns. For each UE pair, the round-trip time (RTT) is 2 d/c. The network may report the RTT in nanoseconds. Because the network knows all the assigned ranging signaling resources for each of the UE, the network can estimate the RTT and therefore the distance between the UEs. When the RTT is combined with the known positions of some UEs or reference nodes, the network can determine the positions of all the UEs.

In some examples, the ranging report may include additional information, for example, UE's GNSS location information, antenna location, vehicle speed and/or direction, radio characteristics, etc. For example, since the signaling and calculation of UE position takes certain time, to accurately reflect the position of the UE, the network can make use of the UE's speed and/or direction to compensate for the differences due to the movements.

In some aspects of the disclosure, the LMF can determine the results of the ranging calculation based on Internal IDs, and then convert the results to External ID based results. In one aspect of the disclosure, the Internal ID can use a small number range, e.g., 32 bits, relative to the External ID because the AMF may use the tracking area and/or RAN node ID to identify the results. The External ID on the other hand may need to have a much larger number range, e.g., 128 bits, because the network needs to identify a UE uniquely regardless of the UE's association. For example, an Internal ID based report may have these data: [Internal ID1, Location 1], [Internal ID2, Location 2], and [Internal ID3, Location3]. Based on stored information, the LMF knows that Internal ID1 corresponds to External ID1, Internal ID2 corresponds to External ID2, and Internal ID3 corresponds to External ID3. Therefore, the LMF can convert the results to [External ID1, Location 1], [External ID2, Location 2], [External ID3, Location 3]. The LMF can send the location results back to the RAN to be delivered either directly to each individual UE or broadcasted to all UEs within the RAN node's coverage area. In some examples, the LMF can cause the RAN to use multimedia broadcast multicast services (MBMS) to broadcast the results. The External ID may be allocated by the AMF to hide the UE's permanent ID so that the LMF does not need to know the UE's permanent ID. Some examples of permanent IDs are International Mobile Subscriber Identity (IMSI), Subscriber Permanent Identifier (SUPI), etc. Because the LMF may cause the RAN to transmit the location result in broadcast/multicast, the External ID may be used to indicate the UE in those announcements while not revealing the UE's true long-term ID (e.g., permanent ID) to improve privacy. In some examples, the External ID may not be needed if obscuring the UE's ID is not a concern or needed. In that case, the UE's permanent ID may be used to identify the UE in the results that may be transmitted by the RAN using broadcast or unicast. The LMF may allocate the Internal ID for internal use between the RAN and LMF. The RAN may use the Internal ID to perform radio resources allocation; therefore the LMF does not need to know the RAT details for the ranging operations, e.g., radio resources index, ZC sequence mapping to the UE, etc.

Figure 5:
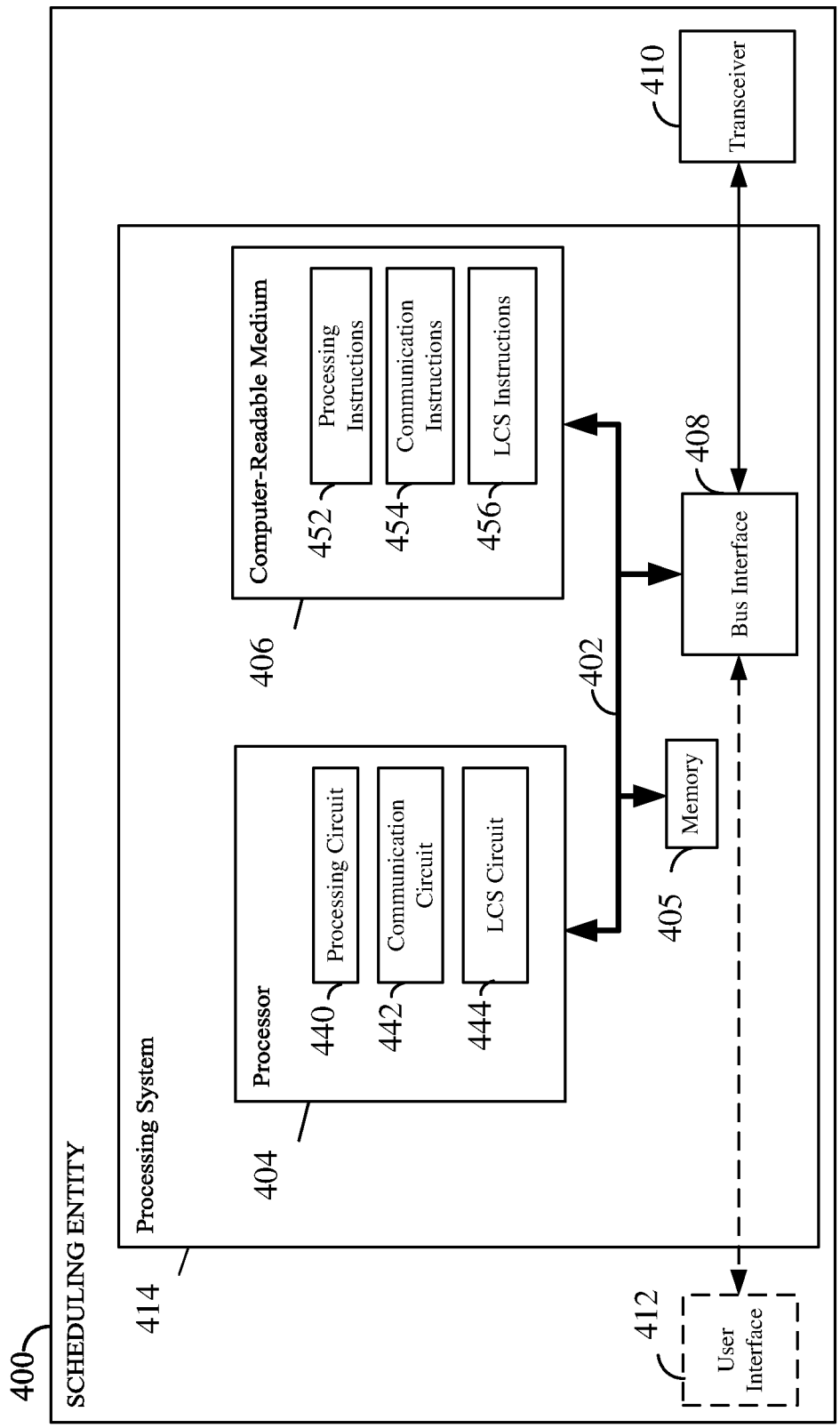
FIG. 5 is a block diagram conceptually illustrating an example of a hardware implementation for a scheduling entity according to some aspects of the disclosure.

FIG. 5 is a block diagram illustrating an example of a hardware implementation for a scheduling entity 400 employing a processing system 414. For example, the scheduling entity 400 may be a user equipment (UE) as illustrated in any one or more of FIGS. 1, 2, and/or 3. In another example, the scheduling entity 400 may be a base station or network node as illustrated in any one or more of FIGS. 1, 2, and/or 3.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described below and illustrated in FIGS. 7-13.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and may be omitted in some examples, such as a base station.

In some aspects of the disclosure, the processor 404 may include circuitry configured to implement one or more of the functions described below in relation to FIGS. 7-13. The processor 404 may include a processing circuit 440, a communication circuit 442, and location service (LCS) circuit 444. The processing circuit 440 may be configured to perform various data processing and logic functions that may be used in wireless communication described herein. The communication circuit 442 may be configured to perform various communication processes and functions described herein. The LCS circuit 444 may perform various location services and ranging operations described herein.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include software configured to implement one or more of the functions described in relation to FIGS. 7-13. The software may include processing instructions 452, communication instructions 454, and location service (LCS) instructions 456. The processing instructions 452 may configure the processor 404 to perform various data processing and logic functions that may be used in wireless communication described herein. The communication instructions 454 may configure the processor 404 to perform various communication processes and functions described herein. The LCS instructions 456 may configure the processor 404 to perform various location services and ranging operations described herein.

Figure 6:
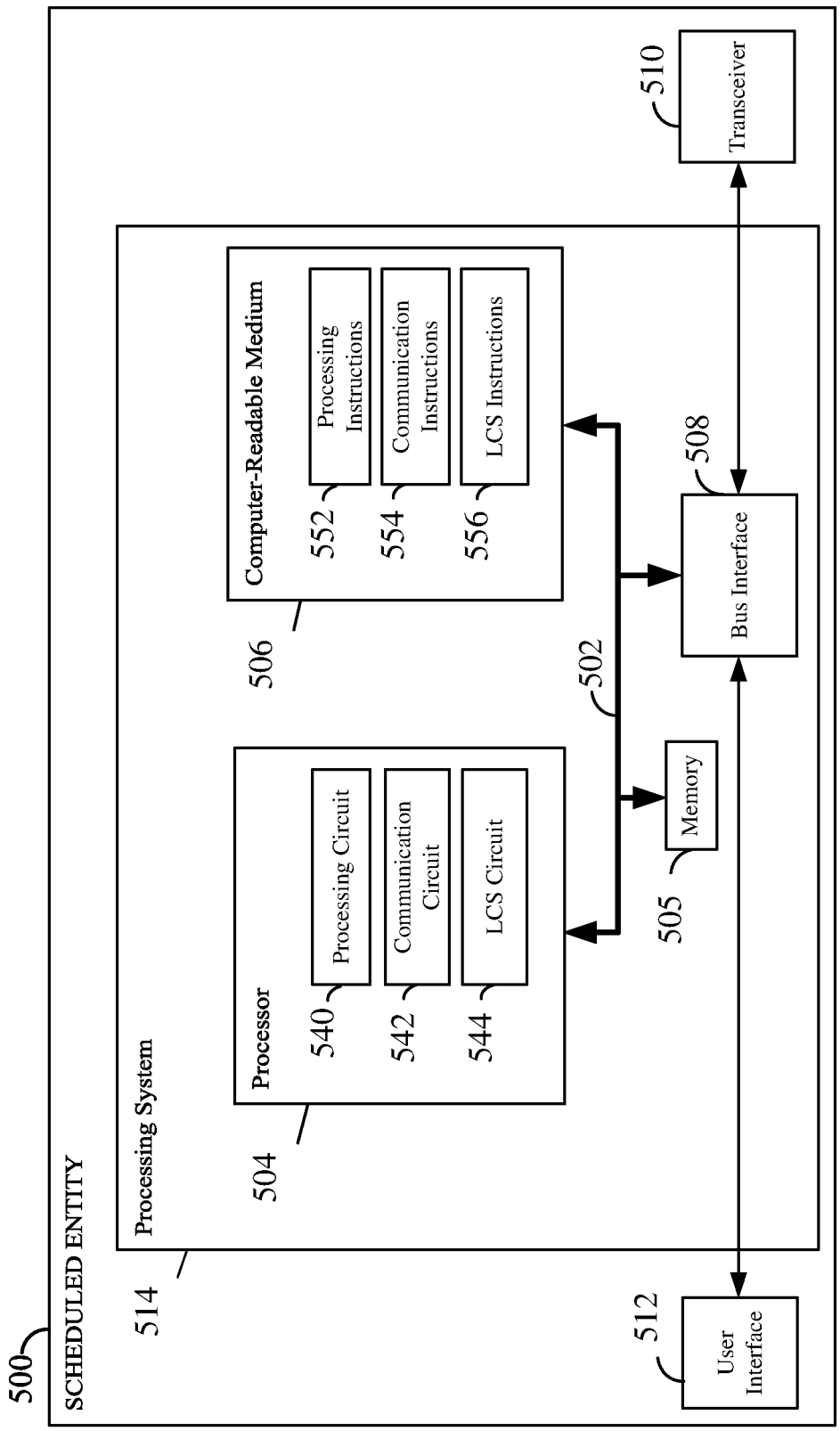
FIG. 6 is a block diagram conceptually illustrating an example of a hardware implementation for a scheduled entity according to some aspects of the disclosure.

FIG. 6 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1, 2, and/or 3.

The processing system 514 may be substantially the same as the processing system 414 illustrated in FIG. 5, including a bus interface 508, a bus 502, memory 505, a processor 504, and a computer-readable medium 506. Furthermore, the scheduled entity 500 may include a user interface 512 and a transceiver 510 substantially similar to those described above in FIG. 5. That is, the processor 504, as utilized in a scheduled entity 500, may be used to implement any one or more of the processes described and illustrated in FIGS. 7-13.

In some aspects of the disclosure, the processor 504 may include circuitry configured to implement one or more of the functions described in relation to FIGS. 7-13. The processor 504 may include a processing circuit 540, a communication circuit 542, and location service (LCS) circuit 544. The processing circuit 540 may be configured to perform various data and signal processing and logic functions that may be used in wireless communication described herein. The communication circuit 542 may be configured to perform various communication processes and functions described herein. The LCS circuit 544 may perform various location services and ranging operations described herein.

In one or more examples, the computer-readable storage medium 506 may include software configured to implement one or more of the functions described in relation to FIGS. 7-13. The software may include processing instructions 552, communication instructions 554, and location service (LCS) instructions 556. The processing instructions 552 may configure the processor 504 to perform various data processing and logic functions that may be used in wireless communication described herein. The communication instructions 554 may configure the processor 504 to perform various communication processes and functions described herein. The LCS instructions 556 may configure the processor 504 to perform various location services and ranging operations described herein.

Aspects of the present disclosure are directed to location service (LCS) support in a wireless communication system and, more particularly, LCS support for V2X ranging based positioning. V2X ranging based positioning involves a group of devices (e.g., UEs or vehicles) coordinated to achieve positioning using ranging signals. Identification, control, coordination, and support of V2X positioning is different from that of other LCS positioning methods, for example, due to ranging signal design and UE privacy requirements. The network may manage (e.g., schedule, allocate) radio resources for V2X ranging based positioning operation, but otherwise has limited involvement in the ranging operation between UEs.

In a network that supports V2X ranging based positioning, the network facilitates the selection of a V2X specific LCS server (e.g., LMF 308) based on, for example, network slicing or the like. With network slicing, a wireless communication network may be separated into a plurality of virtual service networks (VSNs), or network slices, which are separately configured to better suit the needs of different types of services. In other words, network slicing is a form of virtualization that allows multiple logical networks or services to run on top of a shared physical network infrastructure. Some wireless communication networks may be separated, e.g., according to mobile broadband, internet of things (IoT), V2X, and other services. In some examples, a V2X slice may be defined in a network for providing V2X related ranging-based positioning functions. In a next-generation network (e.g., 5G NR), an access and mobility management function (AMF) may bind a V2X specific LCS server (e.g., an LMF 308 of FIG. 3) based on a V2X slice ID. A UE can indicate its desire or support for V2X ranging based LCS using non-access stratum (NAS) signaling between the UE and core network nodes (e.g., AMF and LMF).

In a ranging based location service session, a radio access network (e.g., NG-RAN 306, and in the following description may be referred as RAN) can assist in ranging ID mapping and resources allocation. External ID and Internal ID may be used to protect the privacy of a UE that participates in a ranging based location service session and isolate the radio specific resource management from a core network. A radio access network (RAN) node (e.g., a base station or gNB) may allocate radio resources for use in V2X ranging and map that to the Internal ID of the UE. After mapping to an Internal ID, the RAN node can collect and forward UE's V2X information to an LMF for processing. The LMF may assist in ID management to facilitate V2X ranging privacy and RAT agnostic operation. In one example, the LMF can allocate the Internal ID for use by the RAN node to achieve RAT independence. The LMF can use an External ID to identify a UE in location results to provide privacy protection of the UE when causing the RAN to announce the results using broadcast or multicast. In some examples, the RAN node can refine the radio resources allocation for ranging operation based on a known or estimated location of the UE. For example, based on the knowledge of the rough position of the UE, e.g., in a sector of the cell, to the RAN node can decide which resources pool the UE may use to avoid potential collision or improve on the reception.

An exemplary ranging based LCS session will be described in more detail in relation to FIGS. 7-10 below.

Figure 7:
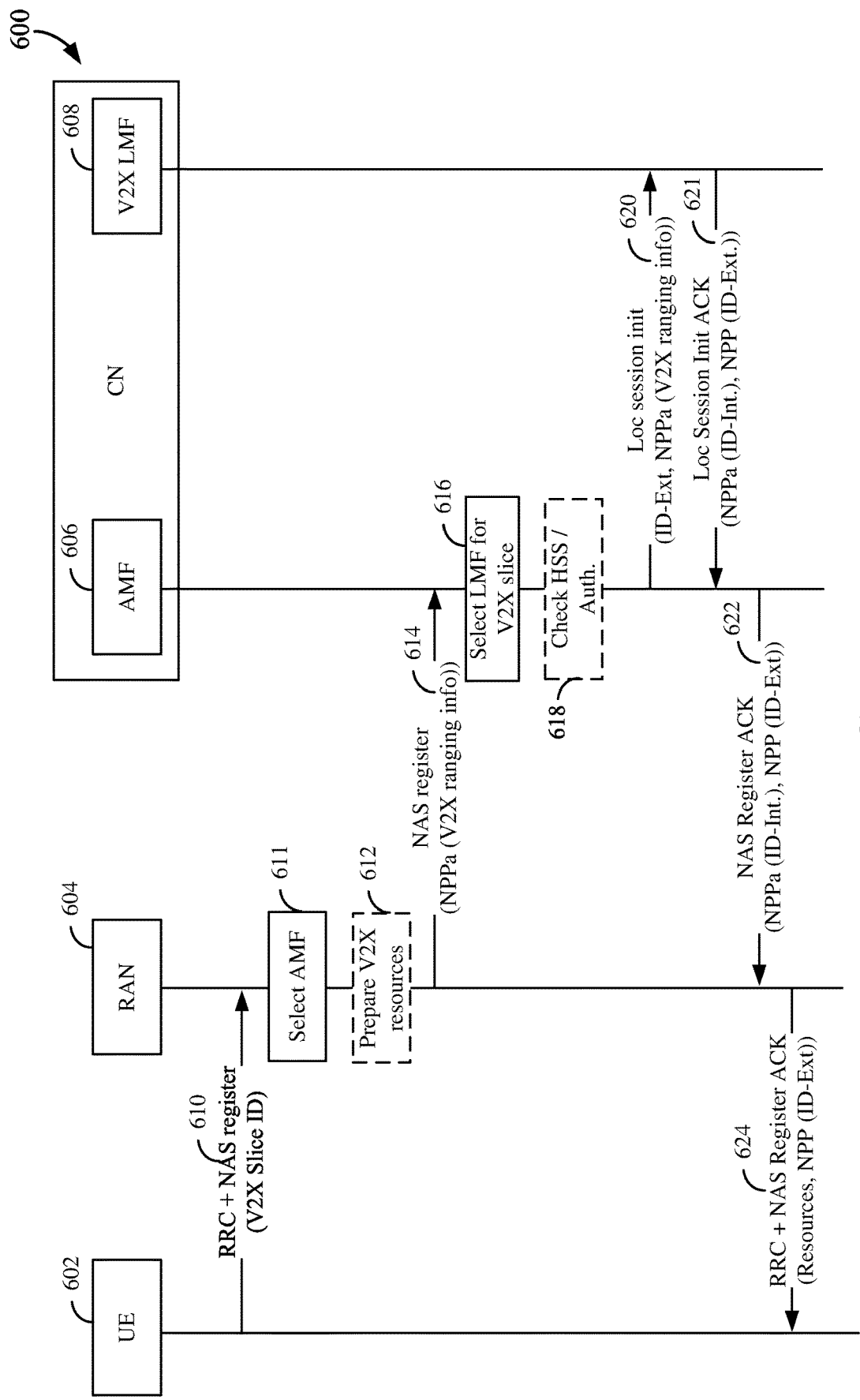
FIG. 7 is a diagram illustrating a signaling process of user equipment registration and selection of a location service server in a wireless communication network according to some aspects of the disclosure.

FIG. 7 is a diagram illustrating a signaling process 600 of UE registration and selection of an LCS server in a wireless communication network according to some aspects of the disclosure. In this example, the signaling process 600 involves a UE 602, a RAN 604, an AMF 606, and an LMF 608. The AMF 606 and LMF 608 may be components of a core network (e.g., CN 304). These entities may be similar or the same to those described and illustrated in FIGS. 1-3. In some examples, the signaling process 600 may be carried out by any suitable apparatus or means for carrying out the functions or algorithm described below.

The UE 602 may establish a radio control resource (RRC) connection with the RAN 604 (e.g., NG-RAN), for example, using a random access procedure. The UE may indicate its desire or request for a network slice (e.g., V2X slice) that supports V2X ranging based location service (LCS). Such indication can be included in an RRC message and an NAS message 610 (e.g., registration request) for UE registration. In response to the registration request, the RAN 604 selects an AMF (e.g., selecting AMF 606 in block 611) that can support this V2X network slice (i.e., support V2X ranging based LCS). The RAN 604 may optionally prepare or allocate V2X ranging radio resources (e.g., in block 612) for the UE. Some examples of these radio resources are time-frequency resources, spatial resources, and coding sequences (e.g., Zadoff-Chu (ZC) sequence and the like). The RAN 604 forwards a UE register message 614 to the selected AMF. The register message 614 may optionally provide V2X ranging related information, for example, cell ID, cell size, frequencies, etc., encapsulated in a positioning protocol message (e.g., illustrated as NPPa (V2X ranging info)) destined for an LMF via the AMF. In an alternative operation, the RAN may send V2X ranging related information in a container Information Element (IE) in a NAS message (e.g., N2 message) towards the AMF. In an alternative operation, the V2X ranging related information may contain an Internal ID proposed by the NG-RAN node (e.g., RAN 604) corresponding to the radio resources reserved for the UE.

In response to the register message 614, based on the indicated V2X slice information, the AMF 606 selects (e.g., in block 616) an LMF (e.g., LMF 608) that can support V2X ranging based LCS. Optionally, the AMF 606 may check (e.g., block 618) whether the UE has a subscription or authorization to use ranging based LCS. Then, the AMF transmits a request (e.g., Loc session init 620) to the LMF to start a ranging based location service session. The AMF may forward the V2X ranging related information, if available, encapsulated in a positioning protocol message (e.g., NPPa (V2X ranging info)). In an alternative operation, the AMF may send the V2X ranging related information in a container IE as part of the interaction between the AMF and LMF.

The AMF 606 may allocate and provide the LMF with an External ID for identifying the UE during the ranging based location service session. For example, the External ID can be used in a location result announcement for the UE over the air interface in the RAN. Because the location result may be seen by all other UEs in the RAN, using the External ID to identify the UE in the location result can hide the UE's permanent ID from other UEs and the LMF. In some examples, the External ID may be replaced with the UE's permanent ID when the RAN communicates with the UE using a point-to-point (e.g., unicast) and/or secured communication. In some examples, the network may use the UE's permanent ID to identify the UE in the location result when privacy is not a concern or needed. Some examples of permanent ID are International Mobile Subscriber Identity (IMSI), Subscriber Permanent Identifier (SUPI), Subscription Concealed Identifier (SUCI), etc. In some aspects of the disclosure, the AMF 606 may change the UE's External ID periodically (e.g., every 5 minutes) or aperiodically to reduce the possibility that the UE could be tracked by other users in the network. The AMF 606 can maintain the External ID as long as the UE is registered with V2X ranging support. The AMF may remove or reassign the External ID when the UE deregisters or disables V2X ranging based LCS. The External ID can be carried within a UE context across AMFs, and can be updated based on AMF's decision. In some examples, the UE may at least partially control the External ID that may be used to identify the UE. For example, the UE may provide the network a key or certificate during registration for location service that may be used to determine or authenticate the External ID.

The LMF 608 may allocate an Internal ID for identifying the UE during the ranging based location service session. The Internal ID is used in communication between the RAN 604 and the LMF 608 using a positioning protocol. A RAN node (e.g., a base station or gNB) can use the Internal ID to identify the UE to the LMF as long as the UE is within the RAN node's coverage. In some examples, the LMF can update or change the Internal ID after a predetermined period of time whether or not the UE remains in the RAN node's coverage. The Internal ID may change less or more frequently than the External ID. The LMF 608 may allocate the Internal ID when ranging based LCS is activated for the UE. The LMF 608 can update the Internal ID when the UE changes its RAN node or RAN area. For example, the LMF 608 can allocate a new Internal ID when the UE communicates with a new RAN node (e.g., gNB). The LMF may deallocate the Internal ID when the UE moves out of the area of a RAN or to another radio access technology (RAT).

In response to the AMF message (e.g., Loc session init message 620), the LMF 608 transmits an acknowledgment message (e.g., Loc session init ACK 621) to the AMF, for example, including the Internal ID and/or External ID. The LMF may encapsulate the External ID in a positioning protocol message (e.g., NPP (ID-Ext.)) destined for the UE. The External ID may be used in direct ranging report from the UEs and location result announcement to the UEs. The LMF may encapsulate the Internal ID in a positioning protocol message (e.g., NPPa (ID-Int.)) destined for the RAN. The AMF 606 forwards the LMF's message in an acknowledgment message (e.g., NAS Register ACK 622), for example including the NPP and NPPa that contain External ID and Internal ID, to the RAN 604. Then, the RAN forwards the NPP message containing the External ID to the UE. The RAN may allocate radio resources accordingly to the UE for ranging use, and associate the radio resources with the Internal ID indicated by the LMF. The RAN may send the radio resource allocation and NPP message that contains the External ID to the UE in a registration response (e.g., a non-access stratum (NAS) Register ACK 624) carried by an RRC message. In some examples, the AMF may forward the NPP message that contains the External ID to the UE as a separate NAS message, instead of piggybacking on the registration response 624.

Figure 8:
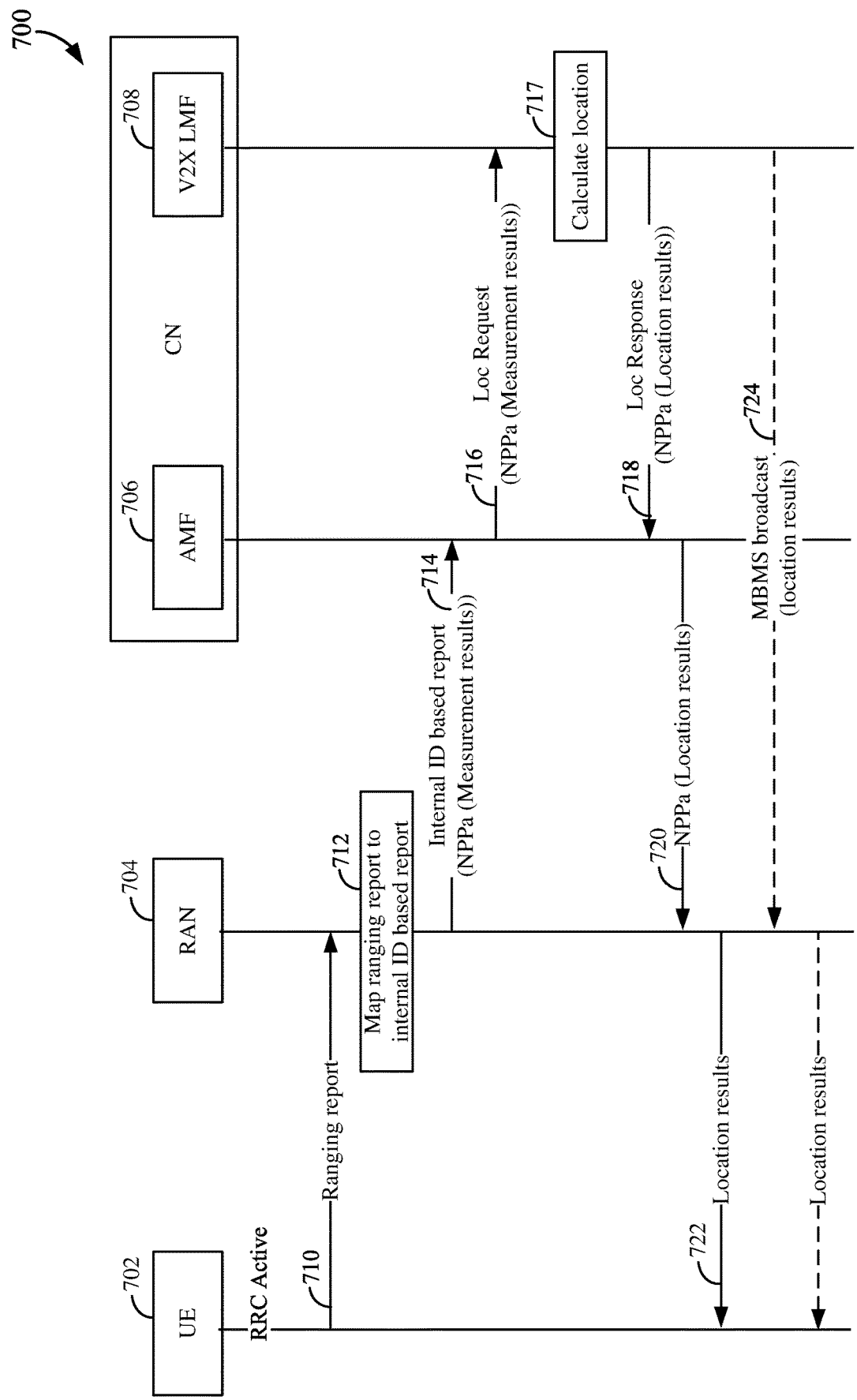
FIG. 8 is a diagram illustrating a signaling process of a ranging based location service with a user equipment in an active mode according to some aspects of the disclosure.

FIG. 8 is a diagram illustrating a signaling process 700 of a ranging based location service in a wireless communication network according to some aspects of the disclosure. In this example, the signaling process 700 involves a UE 702, a RAN 704, an AMF 706, and an LMF 708. The AMF 706 and LMF 708 may be components of a core network (e.g., CN 304). These entities may be similar to those described and illustrated in FIGS. 1-3. In one example, these network entities are the same as those illustrated in FIG. 7. In some examples, the signaling process 700 may be carried out by any suitable apparatus or means for carrying out the functions or algorithm described below.

The UE 702 may be in an RRC connected mode with the RAN 704 and can report its ranging results to the RAN 704 (e.g., a NG-RAN node, gNB, eNB, base station) using an RRC connection. For example, the UE may report the ranging results in an RRC based ranging report 710 that includes, for example, a list of time of arrival (TOA) data, sequence ID, and radio resource index. The ranging report 710 may be called a radio resource based ranging report. The TOA data may include the measured TOA of a ranging signal sent by other UEs (e.g., UE1, UE2, UE3 in FIG. 4) using the ranging radio resources and ZC sequences allocated to other UEs and indicated by a sequence ID and radio resource index. The radio resource index may indicate a subframe number and a symbol number. In one example, there may be 16 subframes with 14 symbols in each subframe. Because the RAN node knows the mapping between the Internal ID and radio resources allocated to the UE 702 for ranging operation, at block 712, the RAN node can convert the radio resource based ranging report to an Internal ID based report. That is the ranging report can be identified by the Internal ID. For example, the Internal ID based report may contain a list of TOA data and corresponding Internal ID. While FIG. 8 only illustrates one UE 702, the RAN node and LMF may receive multiple ranging reports from different UEs in the same area covered by the RAN node. The RAN node 704 may aggregate multiple reports from different UEs and send them to the LMF together in one report message.

The RAN node 704 transmits the Internal ID based report 714 to the LMF 708 via the AMF 706. For example, the RAN can encapsulate the measurement results in a positioning protocol message (e.g., NPPa (measurement results)) destined for the LMF. Then AMF forwards the message to the LMF as a location determination request (e.g., Loc Request 716). With the measurement results, the LMF can calculate, at block 717, the location results and send it back to the AMF in a location determination response (e.g., Loc Response 718). Then, the AMF routes the location results to the RAN 704. The LMF can encapsulate the location results in a positioning protocol message (e.g., NPPa (location results)) destined for the RAN node. The AMF forwards the NPPa (location results) 720 to the RAN without knowing the contents of the location results. The RAN can send the location results 722 dedicated to a single UE or a group of UEs using a dedicated RRC message, cell broadcast, or single cell point-to-multipoint (SC-PTM) transmission. In some aspects of the disclosure, the LMF may cause the RAN to use multimedia broadcast multicast services (MBMS) 724 to send the results to a group of UEs within a group of cells including the RAN 704. In some examples, the LMF can specify the cells that broadcast the results using an MB2 or xMB interface or the like to an MBMS system. In some examples, the LMF may associate the location results with External IDs such that no other UEs can determine the association between the location results 722 and the target UE.

Figure 9:
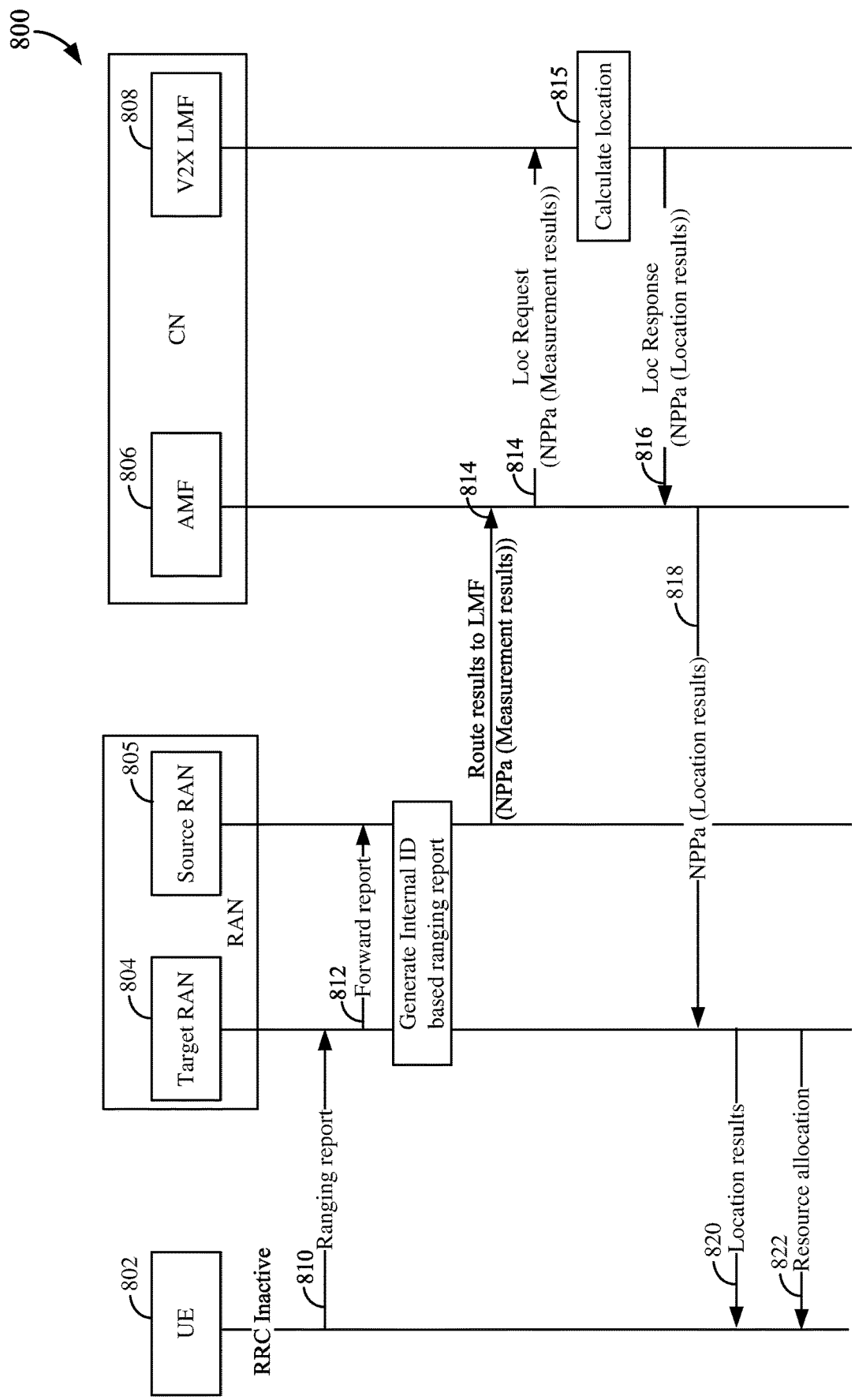
FIG. 9 is a diagram illustrating another signaling process of a ranging based location service with a user equipment in an inactive mode according to some aspects of the disclosure.

FIG. 9 is a diagram illustrating a signaling process 800 of a ranging based location service in a wireless communication network according to some aspects of the disclosure. In this example, the signaling process 800 involves a UE 802, a RAN including a target RAN node 804 and a source RAN node 805, an AMF 806, and an LMF 808. The AMF 806 and LMF 808 may be components of a core network (e.g., CN 304). These entities may be similar to those described and illustrated in FIGS. 1-3. In one example, these network entities are the same as those illustrated in FIGS. 7 and 8. In some examples, the signaling process 800 may be carried out by any suitable apparatus or means for carrying out the functions or algorithm described below.

In this example, the UE 802 was in an RRC inactive mode, and it may have moved to a new coverage area, sector, or cell of a different RAN node (i.e., from a source RAN node to a target RAN node) within the same RAN area. Therefore, when the UE 802 transmits its ranging report 810 to the RAN, the ranging report may be received by a target RAN node 804 that is different from the original RAN node (i.e., a source RAN node 805) that started a ranging based location service session as described above in relation to FIG. 7. In this case, the UE transitioned or switched from the source RAN to the target RAN. In some examples, the RAN nodes may be base stations, eNBs, or gNBs. The target RAN node 804 can forward the ranging report 812 to the source RAN node 805 and include the target RAN node's own ID (e.g., cell ID) so that the LMF knows how to send the location results back to the target RAN node.

Similar to the processes described in relation to FIG. 8, the source RAN node 805 maps the ranging report to an Internal ID based ranging report, and transmits the report 814 to the AMF 806. Then, the AMF 806 forwards the reports 814 to the LMF 808. The RAN node may encapsulate the ranging report 814 in a positioning protocol message (e.g., NPPa (measurement results)) destined for the LMF. The AMF may forward the message to the LMF in a location determination request 814.

In some aspects of the disclosure, the target RAN node 804 can obtain the Internal ID to radio resources mapping information from the source RAN node, and maps the ranging report to an Internal ID based ranging report.

With the UE's ranging based measurement results, the LMF 808 can calculate, at block 815, the location of the UE and send the location results back to the UE via the AMF and RAN. For example, the LMF 808 can transmit a location response 816 including the location results encapsulated in a positioning protocol message (e.g., as NPPa (location results)) destined for the RAN. The AMF forwards the results 818 to the RAN. When the RAN sends the location results 820 dedicated to the UE 802 using wireless communication, the location results may be protected using an External ID like that described in relation to FIGS. 7 and 8 above, so that the UE's location cannot be tracked by other users that may receive the location results. Different from the process described in relation to FIG. 8, the LMF 808 sends the location results back to the target RAN node 804, not the source RAN node 805. The target RAN node 804 may allocate new radio resources 822 to the UE 802 so that the UE can perform ranging operation in an area covered by the target RAN node. In some aspects of the disclosure, the target RAN node can fetch the UE context from source RAN node when it receives the ranging report in 810. This way, the target RAN node can perform the conversion of the ranging report to an Internal ID based report and send it directly to the AMF. The operations performed by the AMF 806 and LMF 808 are substantially similar or identical to those described above in relation to FIG. 8.

In some aspects of the disclosure, instead of forwarding the location results to the target RAN node, the LMF can cause the RAN to broadcast or multicast the location results, for example, using MBMS broadcast or the like.

Figure 10:
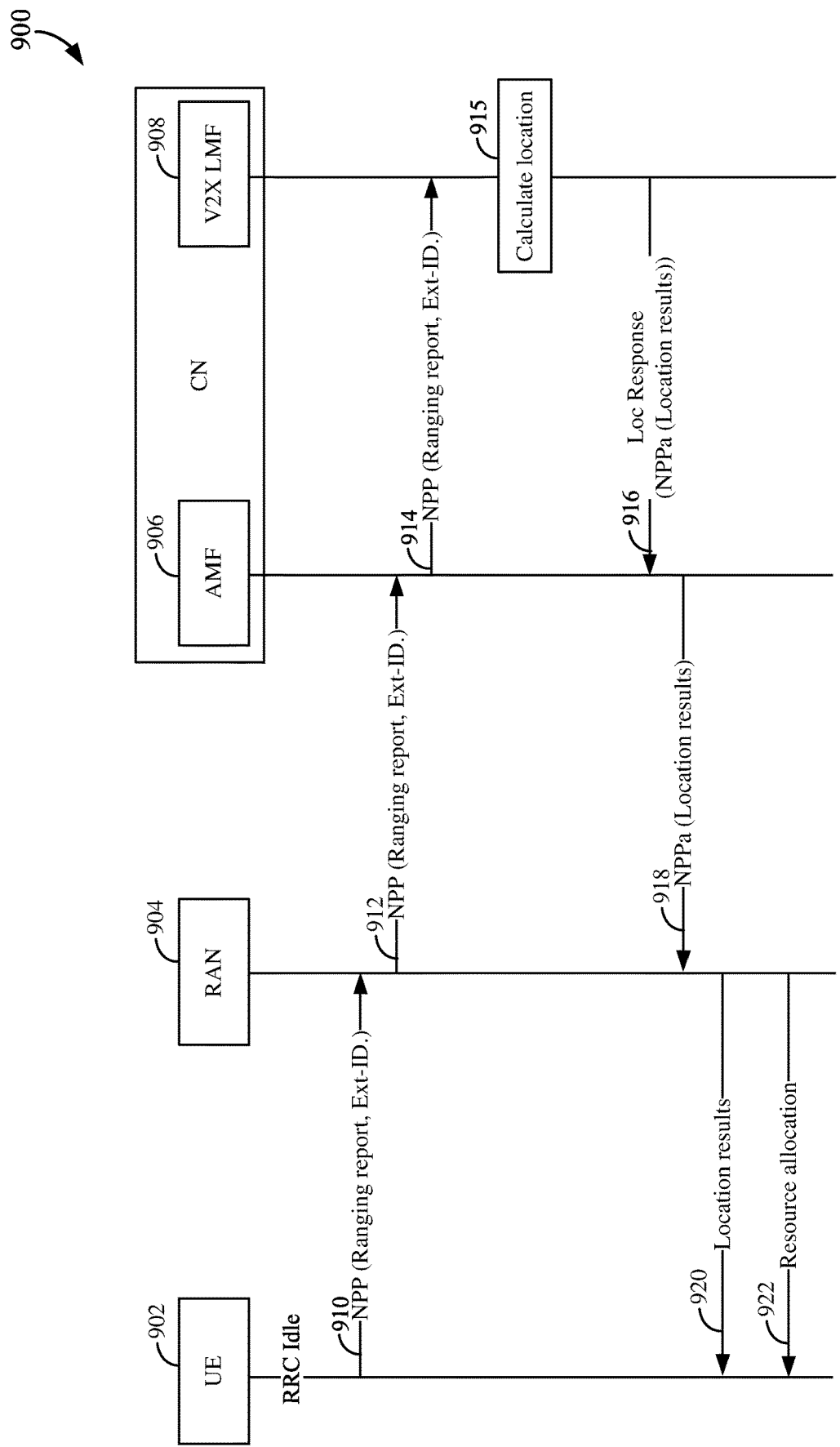
FIG. 10 is a diagram illustrating another signaling process of a ranging based location service with a user equipment in an idle mode according to some aspects of the disclosure.

FIG. 10 is a diagram illustrating a signaling process 900 of a ranging based location service in a wireless communication network according to some aspects of the disclosure. In this example, the signaling process 900 involves a UE 902, a RAN 904, an AMF 906, and an LMF 908. These entities may be similar to those described and illustrated in FIGS. 1-3. In one example, these network entities are the same as those illustrated in FIGS. 7-9. In some examples, the signaling process 900 may be carried out by any suitable apparatus or means for carrying out the functions or algorithm described below.

In this example, the UE 902 is in an RRC idle mode (i.e., no active RRC connection), and the RAN 904 has no UE context for the UE 902 yet. Therefore, the UE may identify its ranging report with the radio resources used and its External ID that is assigned by the AMF 906. The UE 902 transmits a ranging report 910 with its External ID encapsulated in a NAS message to the RAN 904. For example, the UE may encapsulate and transmit the ranging report 910 in a positioning protocol message (e.g., NPP (Ranging report, External-ID)), which is indicated to be routed to the LMF 908. The RAN 904 routes the NPP message 912 to the AMF 906 that further routes the NPP message 914 to the LMF 908. With the ranging report, the LMF 908 can determine the UE's location based on the UE's ranging report.

When the UE 902 is in the idle mode, the UE can use its External ID, cell ID, and/or tracking area identity (TAI) to derive the resources for ranging operation. In one example, the UE may apply a hash function over the External ID, Cell ID or TAI, its own antenna ID or any combination thereof, and use the output of the hash function to select the parameters (e.g., ZC Sequence ID and a resource Index) for ranging operation. In some examples, the UE may select the radio resources within a resource pool reserved for IDLE mode UE ranging operation by the network. For example, the RAN may announce the resource pool in a system information block (SIB), or the base station (e.g., gNB) may configure the resource pool when the UE was in a CONNECTED mode. In some examples, the radio resources may be configured via a provisioning mechanism (e.g., Open Mobile Alliance (OMA) Device Management (DM), or UE Policy configuration), or preconfigured on the UE or UMTS Subscriber Identify Module. The UE 902 may send the report to the LMF 908 via the RAN 904 and AMF 906 without entering into an RRC connected mode.

Based on the ranging report, the LMF can calculate the UE's location results at block 915. The LMF may send the location results to the AMF in a location response 916. The location results may be encapsulated in a positioning protocol message (e.g., NPPa (Location results)) destined for the RAN. The AMF can forward the results 918 to multiple RAN nodes (e.g., a source RAN node and a target RAN node). Then, the RAN can send the location results 920 dedicated to the UE using wireless communication. The location results may be indexed using an External ID like that described in relation to FIGS. 7 and 8 above, so that the UE's location cannot be easily tracked by other users that may receive the location results 920 because the External ID changes frequently so tracking users for a long period of time is difficult. In some examples, the RAN may broadcast the location results to the UE using MBMS or the like.

In one example, the UE 902 may have moved to a new area covered by a target RAN node. In that case, the target RAN node may allocate new radio resources 822 to the UE so that the UE can perform ranging operation in the area covered by the new RAN node.

Figure 11:
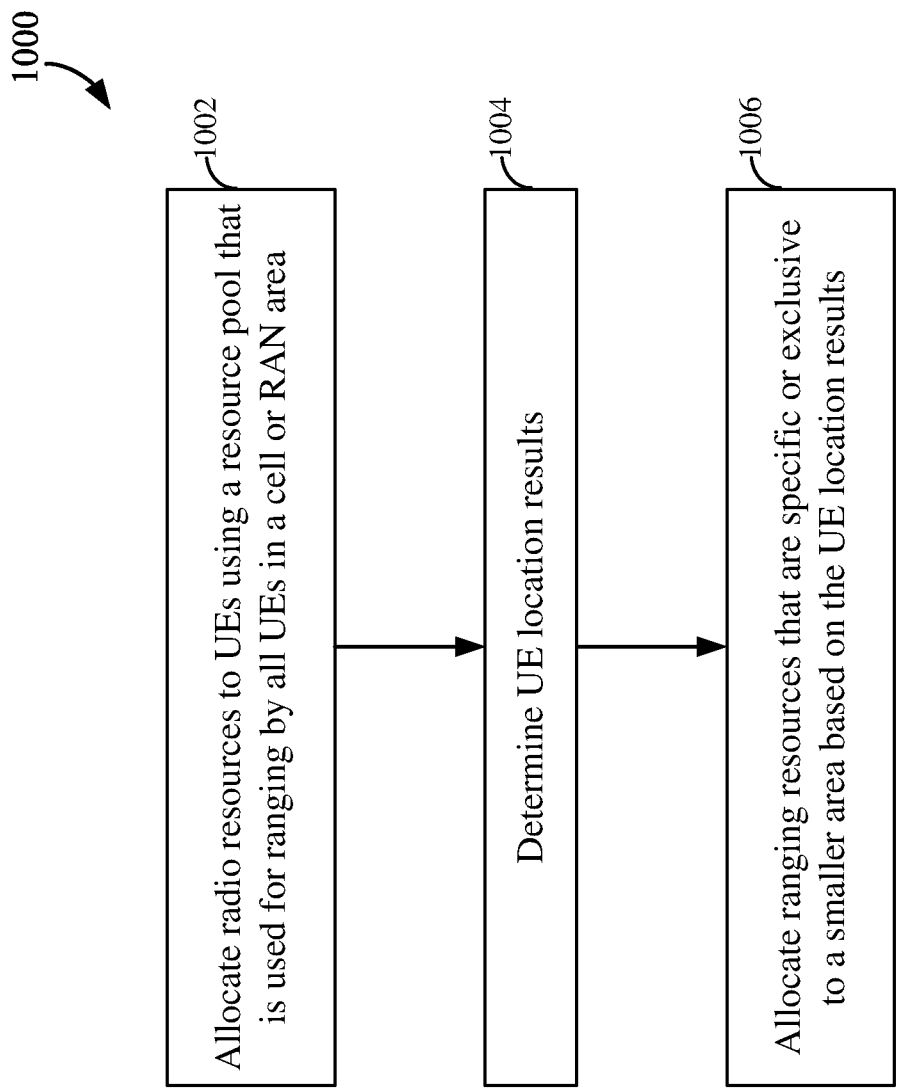
FIG. 11 is a flow chart illustrating a process for allocating ranging radio resources according to some aspects of the present disclosure.

FIG. 11 is a flow chart illustrating a process 1000 for allocating ranging radio resources in accordance with some aspects of the present disclosure. The process 1000 may be performed by the RAN described above in relation to FIGS. 7-10. In some aspects of the disclosure, the RAN can progressively refine the radio resources allocated to the UE for ranging based location service. At block 1002, the RAN can first allocate radio resources to UEs using a resource pool that is used for ranging by all UEs in a cell or RAN area. At block 1004, the RAN determines the UE location results based on UE's ranging report. At block 1006, once a UE's location is known or estimated, the RAN can improve radio resources management by allocating ranging resources that are specific or exclusive to a smaller area (e.g., a sector or zone within the cell or RAN coverage area). By allocating resources for a smaller area, it is possible to reuse resources in different areas of a cell or RAN area. In some examples, the LMF can inform the RAN regarding the UE's location as part of the Internal ID operation.

Figure 12:
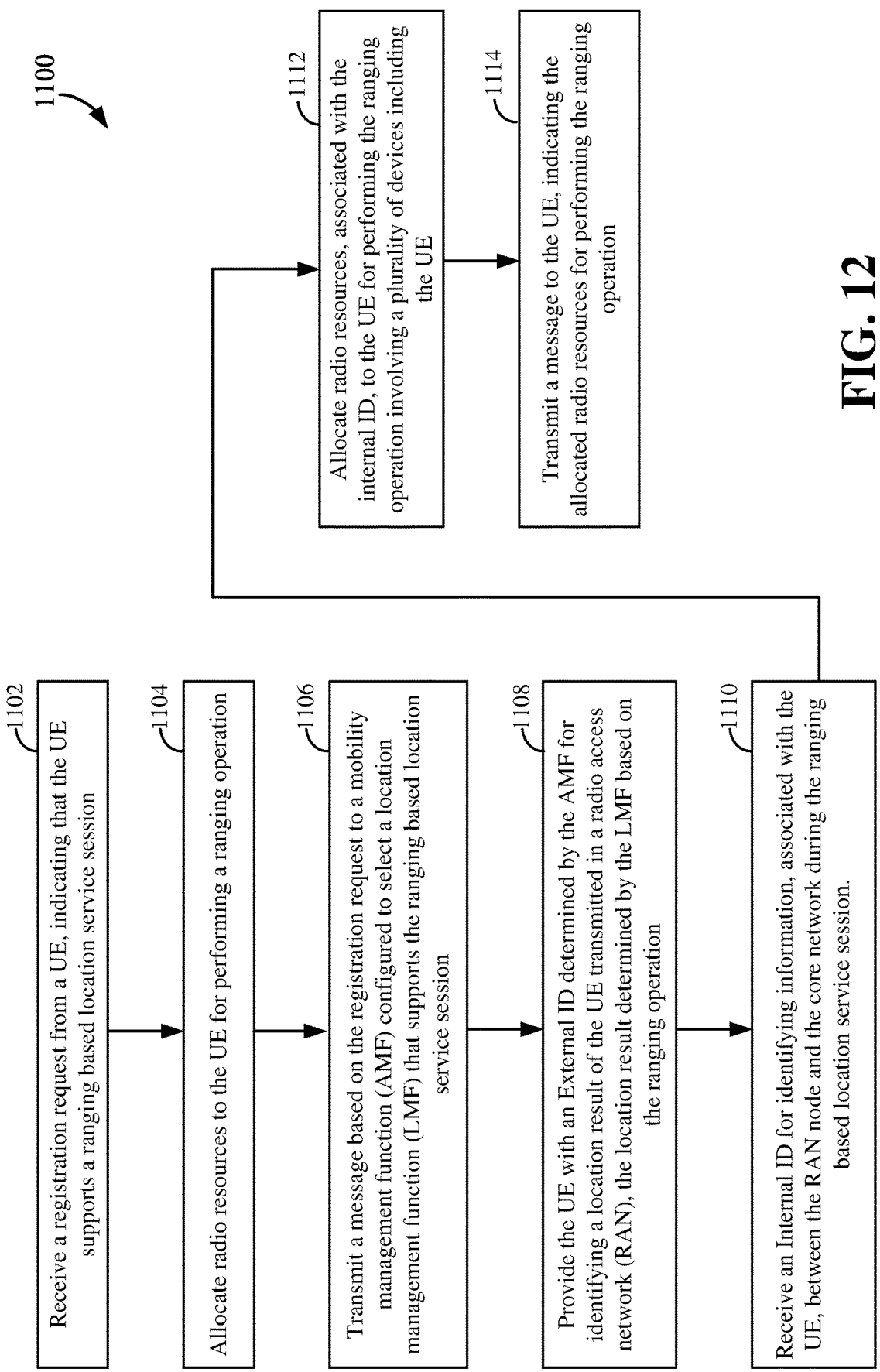
FIG. 12 is a flow chart illustrating an exemplary process for a ranging based location service session according to some aspects of the present disclosure.

FIG. 12 is a flow chart illustrating an exemplary process 1100 of a ranging based location service session in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 400 illustrated in FIG. 5. In some examples, the process 1100 may be carried out by any suitable apparatus or means for carrying out the functions or algorithm described below. In one example, the process 1100 may be carried out by one or more nodes of a radio access network (RAN) and/or a core network.

At block 1102, a RAN node may use a communication circuit 442/transceiver 410 (see FIG. 4) to receive a registration request from a UE. The registration request may indicate that the UE can support a ranging based location service session. For example, a RAN node 306 (e.g., gNB) may receive the registration request (e.g., NAS register 610) from the UE as described in relation to FIG. 7. The connection request may send a registration message included in a non-access stratum (NAS) message destined for a core network node, for example, an access and mobility management function (AMF) 305. In the ranging based location service session, a location management function (LMF) of a core network can be selected to determine the location of the UE using various positioning methods assisted by ranging data provided by the UE.

At block 1104, the RAN node may use an LCS circuit 444 (see FIG. 4) to allocate radio resources to the UE for performing a ranging operation. The ranging operation may involve measuring and/or determining the distances between pairs of UEs among a plurality of UEs using ranging signals transmitted by the UEs. Some non-limiting examples of radio resources are time-frequency resources and sequences (e.g., Zadoff-Chu (ZC) sequence) for transmitting ranging signals.

At block 1106, the RAN node may use the communication circuit 442/transceiver 410 to transmit or forward a message based on the registration request to the AMF configured to select an LMF that supports the ranging based location service session. For example, the AMF 305 may select the LMF 308 that is configured to determine a location result of the UE based on the ranging operation. In some examples, the LMF may determine the location of the UE using ranging reports received from different UEs in an area served by the same RAN node. The RAN node may provide ranging information to the LMF in a positioning protocol message (e.g., NPPa (V2X ranging info)) destined for the LMF.

At block 1108, the RAN node may use the LCS circuit 444 to provide the UE with an External ID determined by the AMF for identifying a location result of the UE transmitted in the RAN. The location result may be determined by the LMF based on the results of the ranging operation from one or more UEs. Using the External ID in association with the location result may protect the identity of the UE from other UEs. In some examples, the External ID may be updated from time to time or periodically by the AMF to reduce the chance that the UE could be tracked beyond short periods of time by other users.

At block 1110, the RAN node may use the communication circuit 442/transceiver 410 to receive an Internal ID for identifying information, associated with the UE, between the RAN node and the LMF during the ranging based location service session. Similar to the Internal ID described in relation to FIGS. 7-10, the LMF can allocate the Internal ID for use by the RAN node to achieve RAT independence.

At block 1112, the RAN node may use the LCS circuit 444 to allocate radio resources, associated with the internal ID, to the UE for performing the ranging operation involving a plurality of devices including the UE. At block 1114, the RAN node may use the LCS circuit 444 to inform the UE of the allocated radio resources for the ranging operation. For example, the RAN node may use the communication circuit 442/transceiver 410 to transmit a message to UE, the message indicating the allocated radio resources for the ranging operation.

Figure 13:
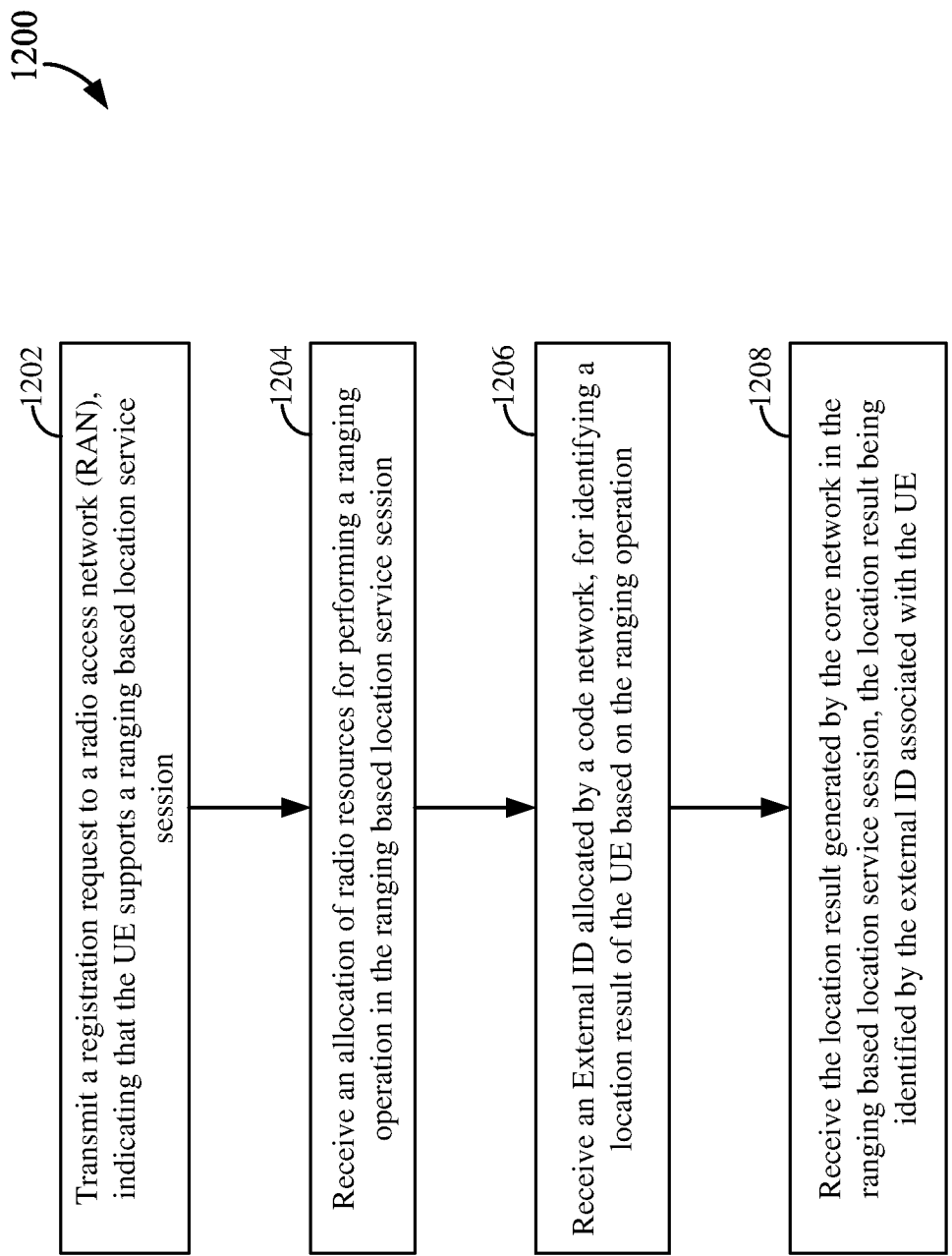
FIG. 13 is a flow chart illustrating another exemplary process for a ranging based location service session according to some aspects of the present disclosure.

FIG. 13 is a flow chart illustrating an exemplary process 1200 of a ranging based location service session in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the scheduled entity 500 illustrated in FIG. 6. In some examples, the process 1200 may be carried out by any suitable apparatus or means for carrying out the functions or algorithm described below. In one example, the process 1200 may be carried out by the UE described in relation to FIGS. 1-4 and 7-10.

At block 1202, a UE uses a communication circuit 542/transceiver 510 (see FIG. 5) to transmit a registration request to a radio access network (RAN), indicating that the UE supports a ranging based location service session. In one example, the registration request may include a registration message 610 in a NAS message destined for an AMF, similar to that described in FIG. 7. At block 1204, the UE may use the communication circuit 542/transceiver 510 to receive an allocation of radio resources for performing a ranging operation. For example, the RAN node (e.g., a base station or gNB) may allocate the UE with certain time-frequency resources and sequences (e.g., ZC sequence) for performing V2X ranging operation.

At block 1206, the UE may use the communication circuit 542/transceiver 510 to receive an External ID allocated by a core network, for example, a mobility management function (AMF). The External ID identifies a location result of the UE determined by a LMF based on measurement results of the ranging operation. At block 1208 the UE may use the communication circuit 542/transceiver 510 to receive the location result generated by the core network, for example, a location management function (LMF) for the ranging based location service session. The UE may use an LCS circuit 444 to identify its location result using its External ID. In some examples, the LMF allocates and transmits the External ID to the UE via the AMF and RAN in a positioning protocol message (e.g., NPPa (Location results)) destined for the UE. The External ID can protect the identity of the UE when its location result is transmitted in the RAN, for example, as a broadcast message that could be received by other users as well.

In one configuration, the apparatus 400 and/or 500 for wireless communication includes various means configured to perform the functions and processes described in relation to FIGS. 1-13. In another aspect, the aforementioned means may be a circuit or any apparatus configured to perform the functions recited by the aforementioned means.

In one aspect of the disclosure, a RAN node includes a communication circuit 442/transceiver 410 that provides the means for receiving a registration request from a UE, indicating that the UE supports a ranging based location service session. The communication circuit 442/transceiver 410 further provides the means for receiving an internal ID for identifying information associated with the UE in communication between the first RAN node and a core network during the ranging based location service session. The RAN node includes an LCS circuit 444 that provides the means for allocating radio resources to the UE for performing a ranging operation in the ranging based location service session involving a plurality of devices including the UE, and associating the radio resources with the internal ID. The LCS circuit 444 may provide the means for providing a registration response to the UE, indicating the allocated radio resources for performing the ranging operation.

In one aspect of the disclosure, a UE includes a communication circuit 542/transceiver 510 that provides the means for transmitting a registration request to a RAN, indicating that the UE supports a ranging based location service session. The communication circuit 542/transceiver 510 may provide the means for receiving, from the RAN, an allocation of radio resources for performing a ranging operation in the ranging based location service session. The LCS circuit 544 may provide the means for performing the ranging operation to generate location results. The communication circuit 542/transceiver 510 may provide the means for receiving an external identifier (ID) from the RAN, the external ID allocated by a core network for identifying a location result of the UE based on the ranging operation. The communication circuit 542/transceiver 510 may provide the means for receiving the location result generated by the core network in the ranging based location service session, the location result being identified by the external ID associated with the UE. The UE may use the LCS circuit 544 as the means for identifying the location result using the external ID.

Of course, in the above examples, the circuitry included in the processor 404/504 is merely provided as an example, and other means for carrying out the described functions may be included within various aspects of the present disclosure, including but not limited to the instructions stored in the computer-readable storage medium 406/506, or any other suitable apparatus or means described in any one of the FIGS. 1-10, and utilizing, for example, the processes and/or algorithms described herein in relation to FIGS. 7-13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of providing a location service at a radio access network (RAN) comprising a first RAN node in wireless communication, comprising:
   receiving a request from a user equipment (UE), indicating that the UE supports a ranging based location service session;
   receiving an internal identifier (ID) allocated by a core network for identifying information, associated with the UE, between the first RAN node and the core network during the ranging based location service session;
   allocating radio resources, associated with the internal ID, to the UE for transmitting a ranging signal in a ranging operation in the ranging based location service session involving a plurality of devices including the UE; and
   transmitting a response to the UE, indicating the radio resources allocated for performing the ranging operation.

2. The method of claim 1, further comprising:
   forwarding the request to a core network entity in the core network, the core network entity configured to select a location management function (LMF) in the core network that supports the ranging based location service session; and transmitting a message to the UE, indicating an external identifier (ID) determined by the core network entity for identifying a location result of the UE transmitted by the RAN.

3. The method of claim 2, further comprising:
receiving, from the UE, a resource based ranging report generated by the ranging operation, the resource based ranging report comprising ranging results indexed by radio resources allocated to the plurality of devices;
converting the resource based ranging report to an internal ID based ranging report, the internal ID based ranging report comprising the ranging results indexed by internal IDs associated with the plurality of devices; and
transmitting the internal ID based ranging report to the LMF.

4. The method of claim 3, further comprising:
receiving the location result from the LMF; and
transmitting, to the UE, the location result identified by the external ID.

5. The method of claim 3, wherein the receiving the resource based ranging report comprises:
receiving the resource based ranging report at a second RAN node; and
forwarding the resource based ranging report to the first RAN node that originally received the request from the UE.

6. The method of claim 3, further comprising:
receiving, at a second RAN node included in the RAN, the resource based ranging report; and
receiving, at the second RAN node, internal ID to radio resources mapping information from the first RAN node for converting the resource based ranging report to the internal ID based ranging report.

7. The method of claim 2, further comprising:
receiving, from the UE in an idle mode, a resource based ranging report generated by the ranging operation, the resource based ranging report encapsulated in a positioning protocol message comprising the external ID of the UE; and
transmitting the positioning protocol message including the resource based ranging report to the LMF.

8. The method of claim 7, further comprising:
receiving, from the LMF, a positioning protocol message comprising the location result; and
transmitting the location result, identified by the external ID, to the UE.

9. The method of claim 1, further comprising:
receiving an internal ID update from the core network in response to the UE transitioning from the first RAN node to a second RAN node of the RAN.

10. The method of claim 1, wherein the allocating radio resources comprises:
allocating first radio resources to the UE for performing the ranging operation in a first area; and
allocating, based on a location result determined using the first radio resources, second radio resources to the UE for performing the ranging operation in a second area that is smaller than the first area.

11. A method of operating a user equipment (UE) in a communication network, comprising:
transmitting a request to a radio access network (RAN), indicating that the UE supports a ranging based location service session;

receiving, from the RAN, an allocation of radio resources for transmitting a ranging signal in a ranging operation in the ranging based location service session;
receiving an external identifier (ID) from the RAN, the external ID allocated by a core network for identifying a location result of the UE based on the ranging operation; and
receiving the location result generated by the core network in the ranging based location service session, the location result being identified by the external ID associated with the UE.

12. The method of claim 11, further comprising:
performing the ranging operation to generate a ranging report; and
transmitting the ranging report to the RAN, the ranging report comprising at least one of time of arrival (TOA) data, a sequence ID, or a radio resource index associated with the ranging operation.

13. The method of claim 12, further comprising encapsulating the ranging report in a positioning protocol message destined for a location management function (LMF) in the core network, the LMF configured to determine the location result based on the ranging report.

14. The method of claim 12, wherein the transmitting the ranging report comprises transmitting the ranging report while the UE is in a radio resource control (RRC) idle mode with no active connection with the RAN.

15. The method of claim 12, further comprising encapsulating the ranging report and the external ID in a positioning protocol message.

16. The method of claim 11, wherein the receiving the location result comprises:
receiving a dedicated message to the UE comprising the location result; or
receiving a broadcast message comprising the location result.

17. The method of claim 11, further comprising:
transmitting the request to a first RAN node of the RAN; and
receiving the location result from a second RAN node of the RAN, different from the first RAN node.

18. The method of claim 17, further comprising:
receiving an allocation of radio resources from the second RAN node for performing the ranging operation.

19. The method of claim 11, further comprising:
transmitting the request to a first RAN node of the RAN;
transitioning from the first RAN node to a second RAN node of the RAN; and
transmitting a ranging report to the second RAN node.

20. A first radio access network (RAN) node of a radio access network, comprising:
a communication interface configured for wireless communication;
a memory; and
a processor operatively coupled to the communication interface and the memory,
wherein the processor and the memory are configured to:
receive a request from a user equipment (UE), indicating that the UE supports a ranging based location service session;
receive an internal identifier (ID) allocated by a core network for identifying information, associated with the UE, between the first RAN node and the core network during the ranging based location service session;
allocate radio resources, associated with the internal ID, to the UE for transmitting a ranging signal in a ranging operation in the ranging based location service session involving a plurality of devices including the UE; and transmit a response to the UE, indicating the radio resources allocated for performing the ranging operation.

21. The first RAN node of claim 20, wherein the processor and the memory are further configured to:

forward the request to a core network entity in the core network, the core network entity configured to select a location management function (LMF) in the core network that supports the ranging based location service session; and transmit a message to the UE, indicating an external identifier (ID) determined by the core network entity for identifying a location result of the UE transmitted by the RAN.

22. The first RAN node of claim 21, wherein the processor and the memory are further configured to:

receive, from the UE, a resource based ranging report generated by the ranging operation, the resource based ranging report comprising ranging results indexed by radio resources allocated to the plurality of devices;

convert the resource based ranging report to an internal ID based ranging report, the internal ID based ranging report comprising the ranging results indexed by internal IDs associated with the plurality of devices; and transmit the internal ID based ranging report to the LMF.

23. The first RAN node of claim 22, wherein the processor and the memory are further configured to:

receive the location result from the LMF; and transmit, to the UE, the location result identified by the external ID.

24. The first RAN node of claim 22, wherein the processor and the memory are further configured to:

receive the resource based ranging report that is forwarded by a second RAN node of the radio access network.

25. The first RAN node of claim 24, wherein the processor and the memory are further configured to:

transmit mapping information to the second RAN node that received the resource based ranging report, for mapping the resource based ranging report to an internal ID based ranging report.

26. The first RAN node of claim 21, wherein the processor and the memory are further configured to:

receive, from the UE in an idle mode, a resource based ranging report generated by the ranging operation, the resource based ranging report encapsulated in a positioning protocol message comprising the external ID of the UE; and transmit the positioning protocol message including the resource based ranging report to the LMF.

27. The first RAN node of claim 26, wherein the processor and the memory are further configured to:

receive, from the LMF, a positioning protocol message comprising the location result; and transmit the location result, identified by the external ID, to the UE.

28. The first RAN node of claim 20, wherein the processor and the memory are further configured to:

receive an internal ID update from the core network in response to the UE transitioning from the first RAN node to a second RAN node of the RAN.

29. The first RAN node of claim 20, wherein the processor and the memory are further configured to:

allocate first radio resources to the UE for performing the ranging operation in a first area; and allocate, based on a location result determined using the first radio resources, second radio resources to the UE for performing the ranging operation in a second area that is smaller than the first area.

30. A user equipment (UE) in a communication network, comprising:

a communication interface configured for wireless communication;

a memory; and a processor operatively coupled to the communication interface and the memory, wherein the processor and the memory are configured to:

transmit a request to a radio access network (RAN), indicating that the UE supports a ranging based location service session;

receive, from the RAN, an allocation of radio resources for transmitting a ranging signal in a ranging operation in the ranging based location service session;

receive an external identifier (ID) from the RAN, the external ID allocated by a core network for identifying a location result of the UE based on the ranging operation; and receive the location result generated by the core network in the ranging based location service session, the location result being identified by the external ID associated with the UE.

31. The UE of claim 30, wherein the processor and the memory are further configured to:

perform the ranging operation to generate a ranging report; and transmit the ranging report to the RAN, the ranging report comprising at least one of time of arrival (TOA) data, a sequence ID, or a radio resource index associated with the ranging operation.

32. The UE of claim 31, wherein the processor and the memory are further configured to:

encapsulate the ranging report in a positioning protocol message destined for a location management function (LMF) in the core network, the LMF configured to determine the location result based on the ranging report.

33. The UE of claim 31, wherein the processor and the memory are further configured to:

transmit the ranging report while the UE is in a radio resource control (RRC) idle mode with no active connection with the RAN.

34. The UE of claim 31, wherein the processor and the memory are further configured to:

encapsulate the ranging report and the external ID in a positioning protocol message.

35. The UE of claim 30, wherein the processor and the memory are further configured to:

receive a dedicated message to the UE comprising the location result; or receive a broadcast message comprising the location result.

36. The UE of claim 30, wherein the processor and the memory are further configured to:

transmit the request to a first RAN node of the RAN; and receive the location result from a second RAN node of the RAN, different from the first RAN node.

37. The UE of claim 36, wherein the processor and the memory are further configured to:

receive an allocation of radio resources from the second RAN node for performing the ranging operation.

38. The UE of claim 30, wherein the processor and the memory are further configured to:

transmit the request to a first RAN node of the RAN;
transition from the first RAN node to a second RAN node of the RAN; and
transmit a ranging report to the second RAN node.

* * * * *